US011148829B2

(12) United States Patent
Schneider et al.

(10) Patent No.: US 11,148,829 B2
(45) Date of Patent: Oct. 19, 2021

(54) ARRESTING CABLE RETRACTION SYSTEM

(71) Applicant: Engineered Arresting Systems Corporation, Aston, PA (US)

(72) Inventors: Kirk F. Schneider, Springfield, PA (US); Justin S. Agren, Philadelphia, PA (US); Travis L. Chaney, Aston, PA (US); Christopher J. Levesque, Glenolden, PA (US); Scott A. Smith, Elkton, MD (US); Kenneth J. Neeld, West Chester, PA (US); Isaac Arroyo-Marquez, Cherry Hill, NJ (US); Craig H. Scott, Mountain Lakes, NJ (US)

(73) Assignee: ENGINEERED ARRESTING SYSTEMS CORPORATION, Aston, PA (US)

( * ) Notice: Subject to any disclaimer, the term of this patent is extended or adjusted under 35 U.S.C. 154(b) by 256 days.

(21) Appl. No.: 16/501,586

(22) Filed: May 3, 2019

(65) Prior Publication Data

US 2019/0352019 A1 Nov. 21, 2019

Related U.S. Application Data

(60) Provisional application No. 62/666,389, filed on May 3, 2018, provisional application No. 62/720,737, filed on Aug. 21, 2018.

(51) Int. Cl.
*B64F 1/02* (2006.01)

(52) U.S. Cl.
CPC .................................. *B64F 1/029* (2020.01)

(58) Field of Classification Search
CPC .................................. B64F 1/029; B64F 1/02
See application file for complete search history.

(56) References Cited

U.S. PATENT DOCUMENTS

| 2,919,871 | A | * | 1/1960 | Sorensen | B64F 1/029 |
| | | | | | 244/110 C |
| 2,967,683 | A | | 1/1961 | Crater | |
| 3,167,277 | A | * | 1/1965 | Cotton | B64F 1/029 |
| | | | | | 244/110 C |
| 3,589,652 | A | | 6/1971 | Thompson | |
| 3,620,489 | A | * | 11/1971 | Riblett, Jr. | B64F 1/029 |
| | | | | | 244/110 C |

(Continued)

OTHER PUBLICATIONS

International Patent Application No. PCT/US2019/000020, Search Report and Written Opinion, dated Jul. 25, 2019.

*Primary Examiner* — Richard R. Green
*Assistant Examiner* — William L Gmoser
(74) *Attorney, Agent, or Firm* — Kilpatrick Townsend & Stockton LLP

(57) ABSTRACT

An arresting cable retraction mechanism for use across an aircraft runway. The retraction mechanism functions to extend a cable across a runway (for capture by a tailhook of an aircraft) without causing the cable to recede below the runway surface during an aircraft rollover/deflection event. The arresting cable retraction mechanism is also designed to help prevent damage to a retraction motion actuator due to high speed aircraft rollover. The disclosed system separates components related to retraction vs. deflection due to rollover, such that rollover events do not affect or load the motion actuator used for retraction.

14 Claims, 25 Drawing Sheets

(56) References Cited

U.S. PATENT DOCUMENTS

| | | | |
|---|---|---|---|
| 3,726,498 A * | 4/1973 | Schlegel | B64F 1/029 244/110 C |
| 3,807,669 A * | 4/1974 | Mayhew, Jr. | B64F 1/029 244/110 C |
| 3,880,386 A | 4/1975 | Byrne et al. | |
| 4,441,672 A * | 4/1984 | Aglae | B64F 1/029 244/110 C |
| 6,394,390 B1 | 5/2002 | Colarik et al. | |

* cited by examiner

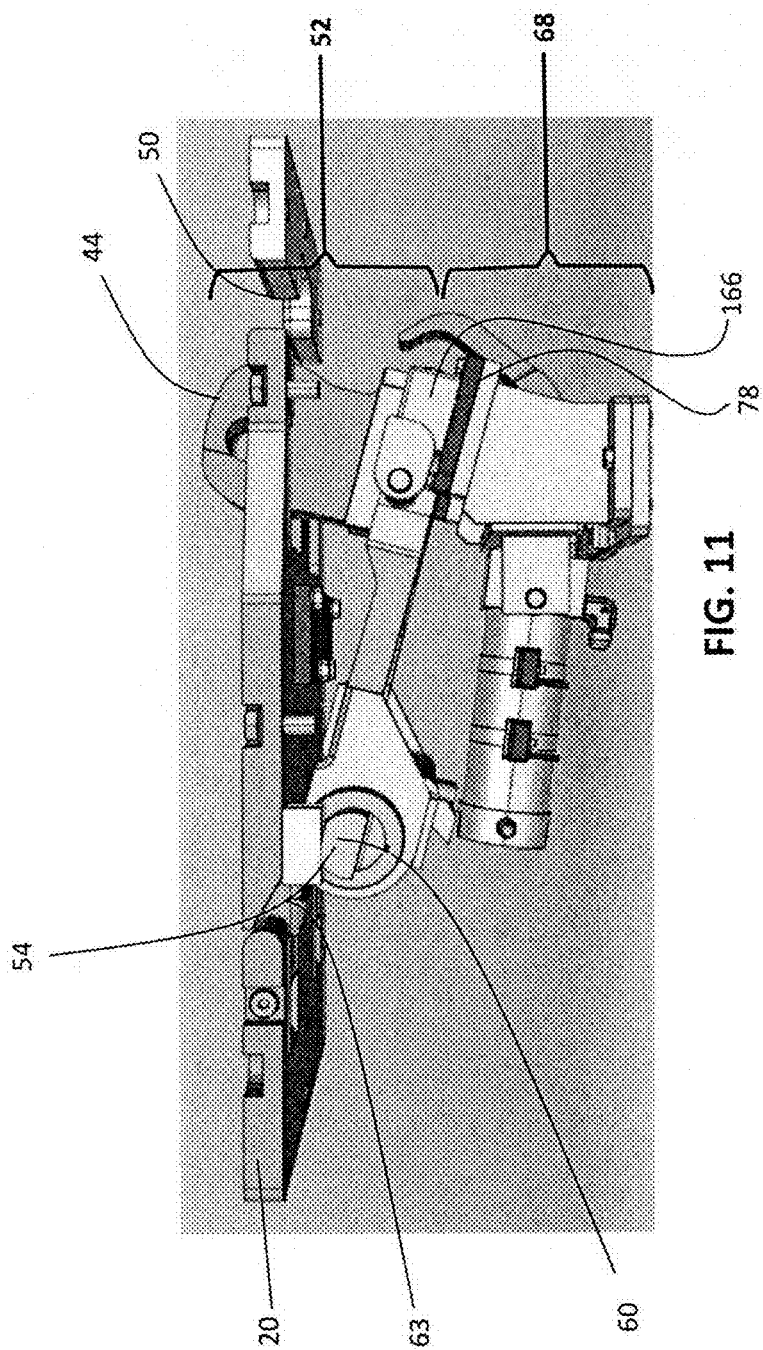

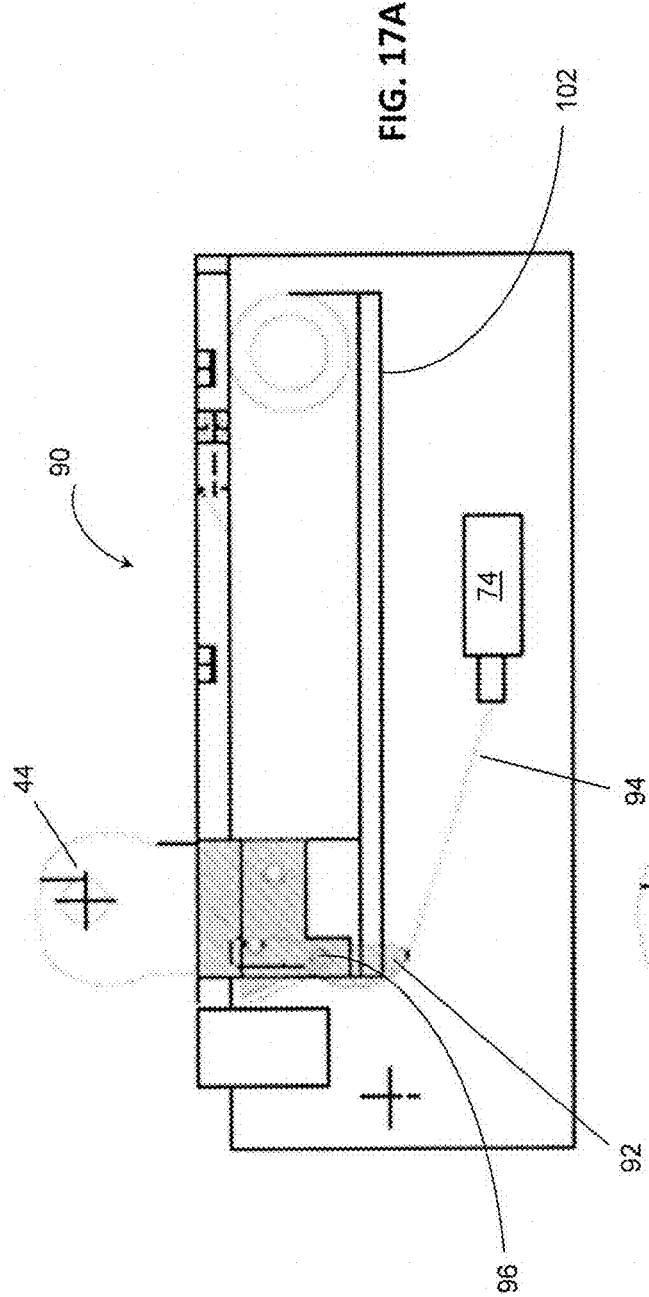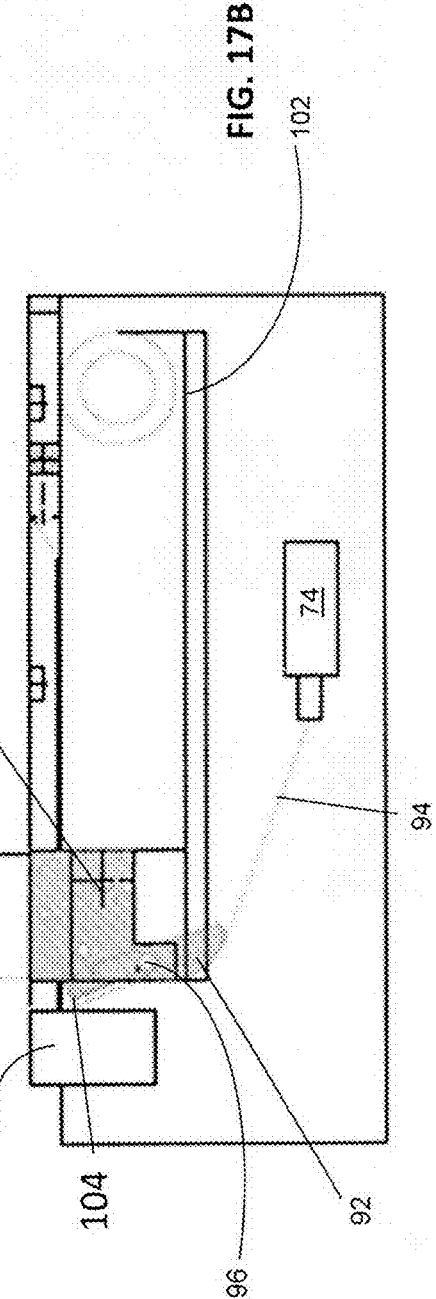

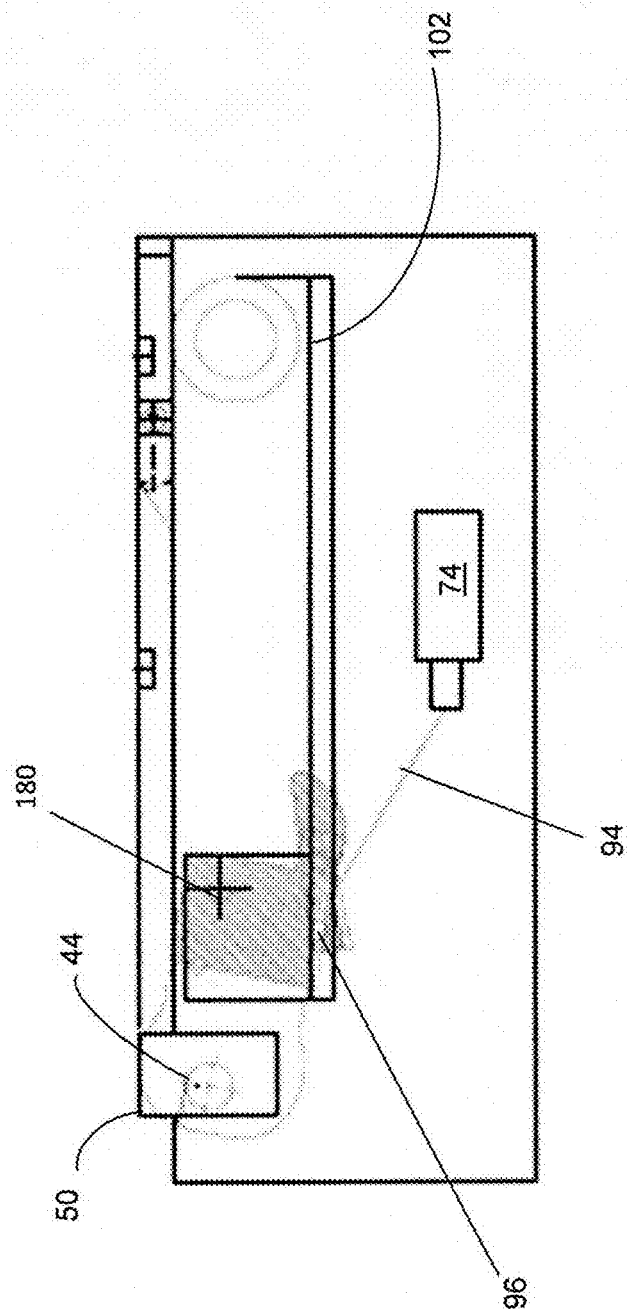

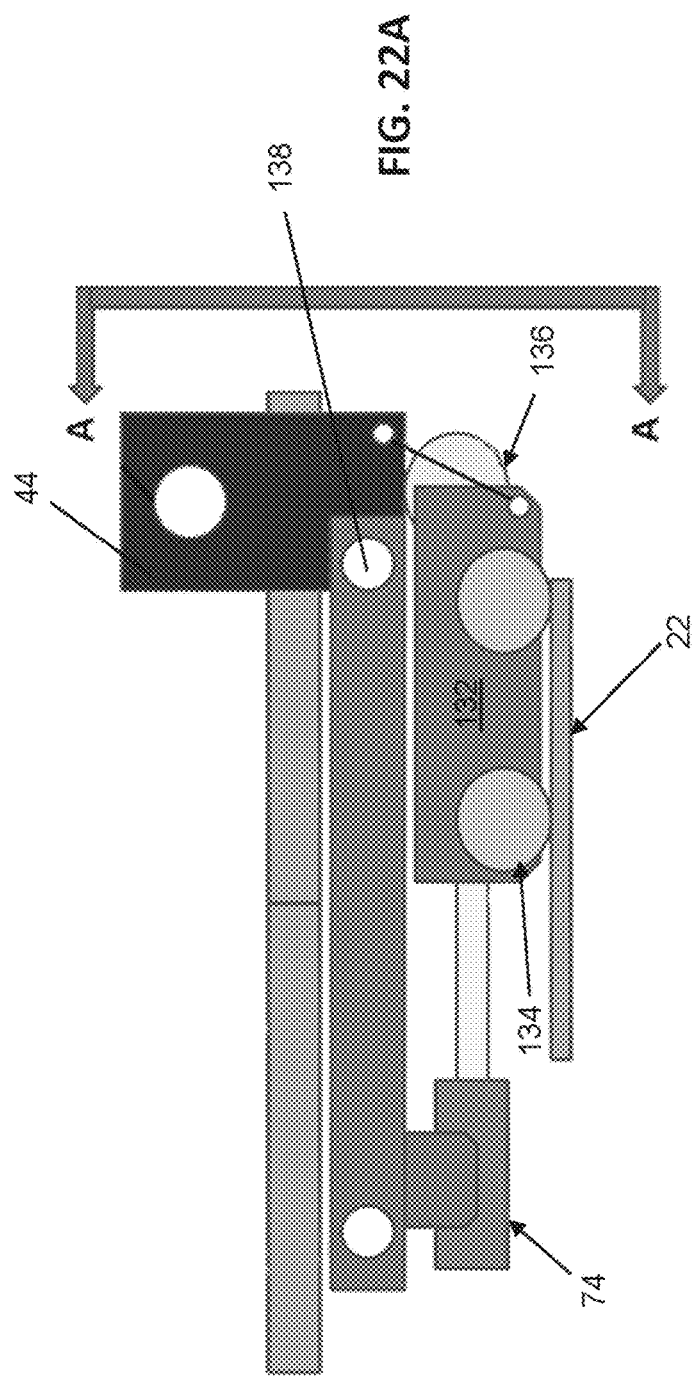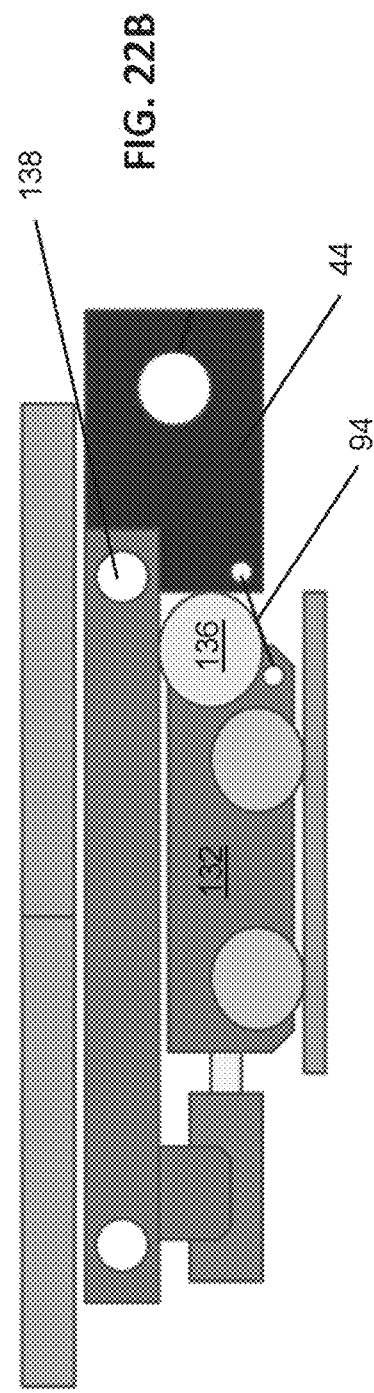

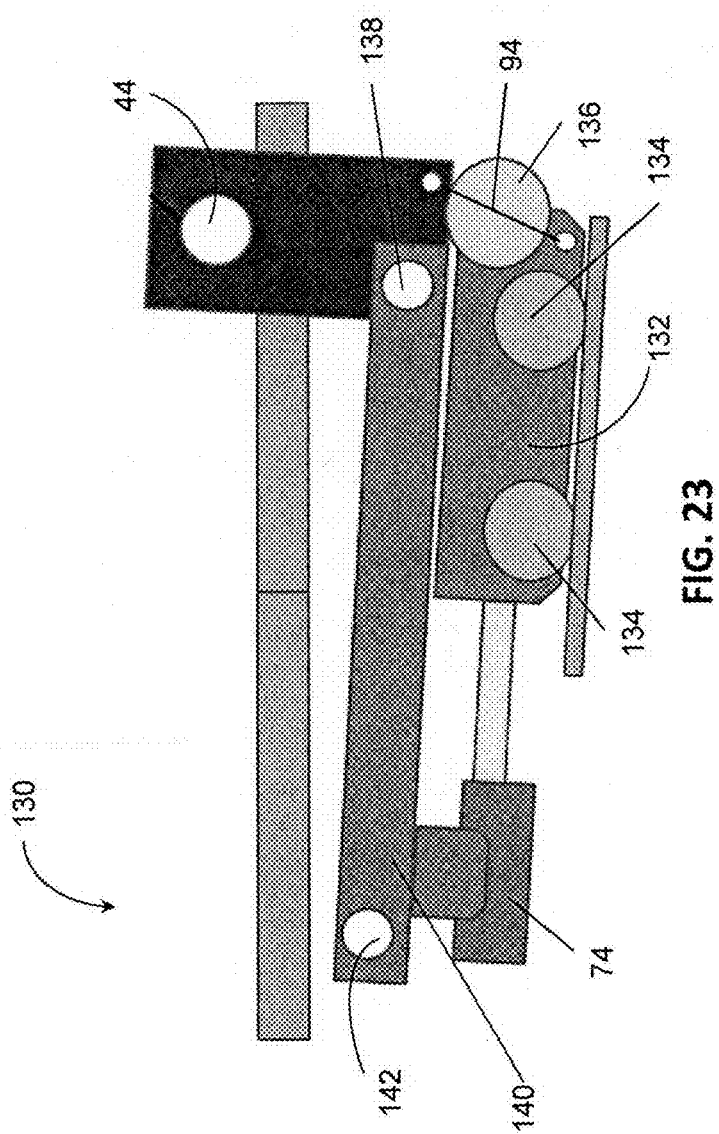

ARRESTING CABLE RETRACTION SYSTEM

CROSS REFERENCE TO RELATED APPLICATIONS

This application is related to and claims priority benefits from U.S. Provisional Application Ser. No. 62/666,389, filed on May 3, 2018, entitled "Arresting Cable Retraction Mechanism for High Speed Aircraft Rollover," as well as U.S. Provisional Application Ser. No. 62/720,737, filed on Aug. 21, 2018, entitled "Arresting Cable Retraction Mechanism for High Speed Aircraft Rollover," the entire contents of each of which are hereby incorporated by this reference.

FIELD OF THE INVENTION

The field of this disclosure relates to an arresting cable retraction mechanism for use across an aircraft runway. The retraction mechanism functions to raise a cable above a runway (for capture by a tailhook of an aircraft) without causing the cable to recede below the runway surface during an aircraft rollover/deflection event. The arresting cable retraction mechanism is also designed to help prevent damage to a motion actuator due to high speed aircraft rollover. The disclosed system separates components related to retraction vs. deflection due to rollover, such that rollover events do not affect or load the motion actuator used for retraction and the mass of the system being deflected is minimized.

BACKGROUND

One type of aircraft arresting system that is used to decelerate an aircraft functions by raising a cable across the runway. These systems are often installed on runways (commercial or military) where aircraft equipped with a tailhook may need to land. In use, the tailhook of the aircraft can engage the cable in order to bring the aircraft to a safe stop.

One component of an aircraft arresting system 10 is an arresting cable retraction mechanism. As shown by FIG. 1, these mechanisms are used to retract a cross-runway cable 12 into a trough that spans the runway below the runway surface in order to provide an obstruction-free runway when the cross-runway cable 12 is not in use. During flight operations, an arresting cable retraction mechanism 14 raises the cable 12 to the battery (i.e., engagement ready) position. This position holds the cross-runway cable at the correct height above the runway to allow the tailhook of an aircraft to engage the cable connected to the aircraft arresting system, bringing the aircraft to a controlled and safe stop. FIG. 1 illustrates an aircraft arresting system 10 with a cable 12 extending across the runway. FIG. 2 illustrates the system of FIG. 1, along with runway edge sheaves 150 and brake systems/energy absorbers 152. These components are positioned alongside the runway for managing payout tape 154 that is secured to the cable 12 for a safe aircraft stop. FIG. 3 illustrates a schematic view of an aircraft with a tailhook engaging a cross-runway pendant cable 12.

Referring back to FIGS. 1 and 2, there are multiple individual retraction mechanisms 14 mounted below the runway surface. Operation of the retraction mechanisms 14 takes place from a control tower system 16 or a control system located off the runway near the arresting system, depending upon fight operations and requirements.

Because these systems are installed on runways over which aircraft travel at high speeds, the mechanisms 14 often experience impact loading from aircraft wheels during a rollover event. This means that the systems are consequently subject to frequent periodic maintenance. Current arresting cable retraction mechanisms available on the market are not designed to withstand the forces of a high-speed aircraft rollover. These mechanisms are typically only rated for rollovers of up to 25 knots. However, current military operating procedures dictate that an arresting cable retraction mechanism must be able to withstand rollover speeds in excess of 25 knots. Improvements to arresting cable retraction mechanisms are thus desirable.

SUMMARY

Accordingly, the present inventors have designed an arresting retraction system that decouples the motion actuator used to lower the cable below the runway surface from components associated with deflection due to rollover. Decoupling these components helps isolate the motion actuator and related components from the dynamic loading associated with a rollover event. This allows the presently disclosed system to withstand high speed and high frequency rollover events, extending the life and operational envelope of the motion actuator and the system as a whole.

According to certain embodiments of this disclosure, there may be provided an arresting cable retraction system for securing a cross-runway cable across an aircraft runway, comprising: a cable support block assembly configured to receive a cross-runway cable; a first axis of rotation about which the support arm assembly rotates during an aircraft rollover event, wherein the cable is maintained above the runway; and a second axis of rotation about which the cable support block assembly rotates during a retraction event, wherein the cable is retracted into a runway trough. The system may also include a support arm assembly, with the cable support block assembly comprising a lock mechanism that secures the support block assembly to the support arm assembly. In some examples, when the lock mechanism is locked, the support arm assembly rotates about the first axis of rotation upon aircraft will pressure to the cable support block assembly. The system may also include a retraction arm assembly, wherein the retraction arm assembly functions to release the lock mechanism to decouple the support block assembly from the support arm assembly. In some examples, when the lock mechanism is unlocked, the support block assembly rotates about the second axis of rotation to retract the cable into the runway trough. The support arm assembly can have a main shaft that functions as the first axis of rotation, and the retraction arm may have a support block shaft that functions as the second axis of rotation. 14. The arresting cable retraction system may be positioned in a support box that comprises a top cover with a cable relief indentation.

For locking the cable support assembly to the support arm assembly, the support arm may have one or more lock blocks that receive a lock pin in order to secure the support block assembly to the support arm assembly. There may also be provided a retraction arm and a motion actuator, wherein the motion actuator is operably coupled to the retraction arm assembly.

In other examples, the motion actuator may be coupled to a latch lock via a cable. In a further example, a movable trolley may be provided, wherein when the movable trolley is in a first position, the cable support block is permitted to rotate with respect to the movable trolley, wherein when the movable trolley is in a second position, the cable support block is prevented from rotation with respect to the movable trolley.

There may also be provided a modular cable support clock for an arresting cable retraction system for securing a cross-runway cable across an aircraft runway, comprising: a modular support block defining an opening for receiving a cross-runway cable; a housing configured to receive the modular support block, wherein the modular support block is removeably secured with respect to the housing; and a lock mechanism that secures the modular support block with respect to the housing. In some examples, the removable securement is achieved via insert grooves positioned along one of the modular support block or the housing that cooperate with tracks positioned on the other of the modular support block or the housing.

BRIEF DESCRIPTION OF THE DRAWINGS

FIG. 11 is a side perspective view of movement of the cable support block assembly and support arm assembly during a rollover, also showing the location of a retraction arm assembly that is disengaged from the support arm assembly.

FIGS. 17A-17C show an alternate embodiment of a retraction/roller mechanism. FIGS. 17A and 17B show release of a latch lock. FIG. 17C shows rotation of the support block into a retracted position.

FIGS. 19A and 19B show release of a lock mechanism via a cable and rotation of the support block into a retracted position.

FIG. 22A shows the mechanism of FIG. 21 in a raised/battery position. FIG. 22B shows the mechanism of FIG. 21 in a retracted position.

FIG. 23 shows the mechanism of FIGS. 22A-22B in a rollover position.

DETAILED DESCRIPTION

Arresting cable retraction mechanisms are generally designed to raise and lower a cross-runway cable above and below an aircraft runway. The mechanisms should also be capable of withstanding rollover by aircraft tires. The present disclosure provides an arresting cable retraction mechanism that decouples the retraction components from the components that experience the force from an aircraft rollover. This provides a more robust system that can withstand higher aircraft speeds while requiring reduced maintenance.

During military operations, arresting cable retraction mechanism systems are often left in the battery position (i.e., a raised and engagement ready position), which exposes the system to frequent impacts due to aircraft rollovers. The frequency of impacts due to rollovers can result in damage to the actual retraction components, can prevent the retraction mechanism from operating reliably, or can require additional servicing or repairs of the system.

Based on some of the above-described problems with current arresting cable retraction mechanisms, the present inventors realized that it is desirable to provide a system that more effectively absorbs and distributes the forces of frequent high-speed aircraft rollovers. A stronger and more robust mechanism has been developed. The increased robustness of the disclosed system can help decrease maintenance costs and keep maintenance personnel off of active runways and out of danger during flight operations due to fewer required maintenance actions. The system is also more effective at absorbing and distributing the forces of frequent high-speed aircraft rollovers, increasing operability and reliability while decreasing time spent on maintenance.

Figure 1:
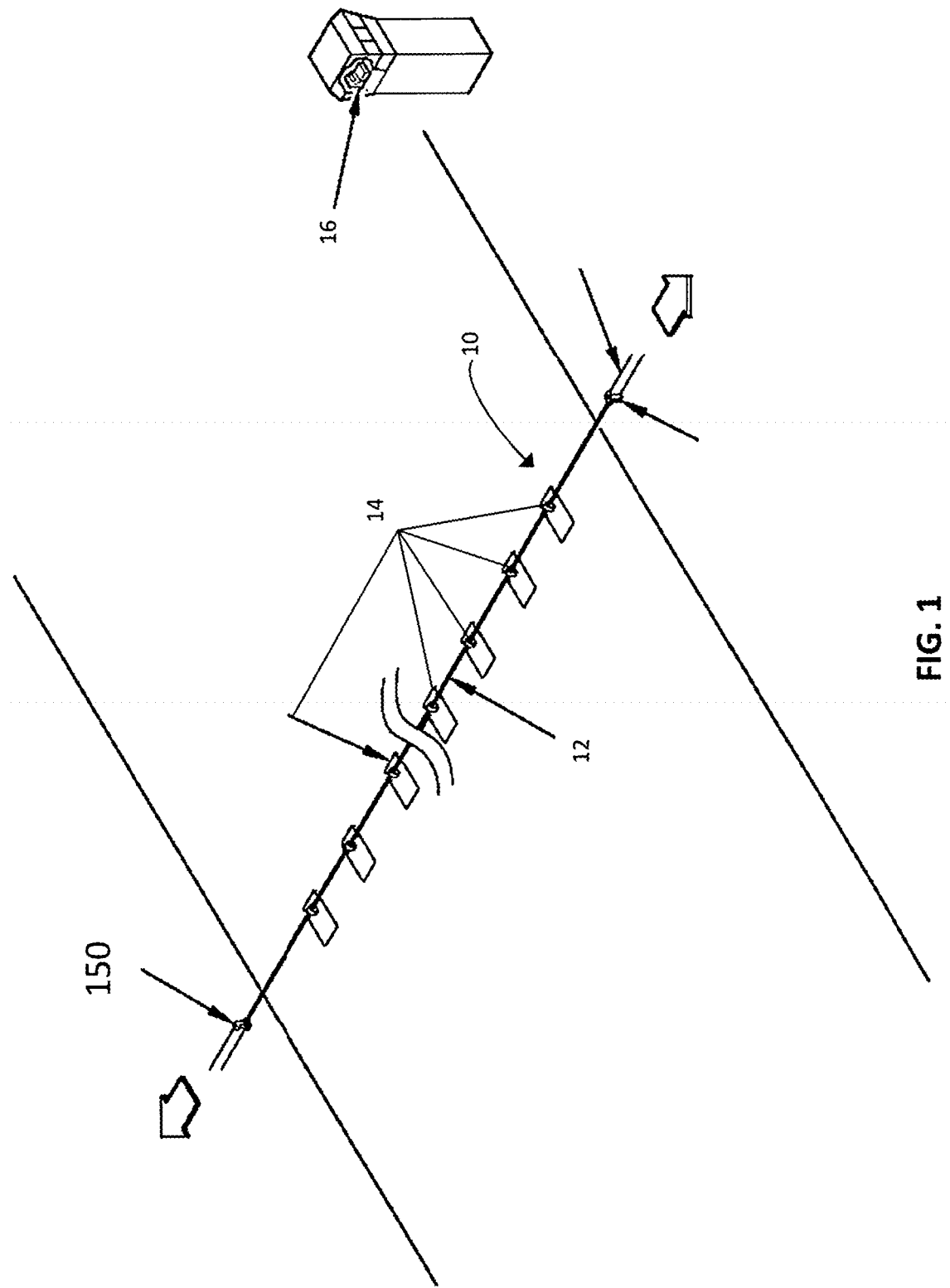
FIG. 1 is a side perspective view of a cross-runway cable extending across an aircraft runway and being positioned via a series of arresting cable retraction mechanisms.
Figure 2:
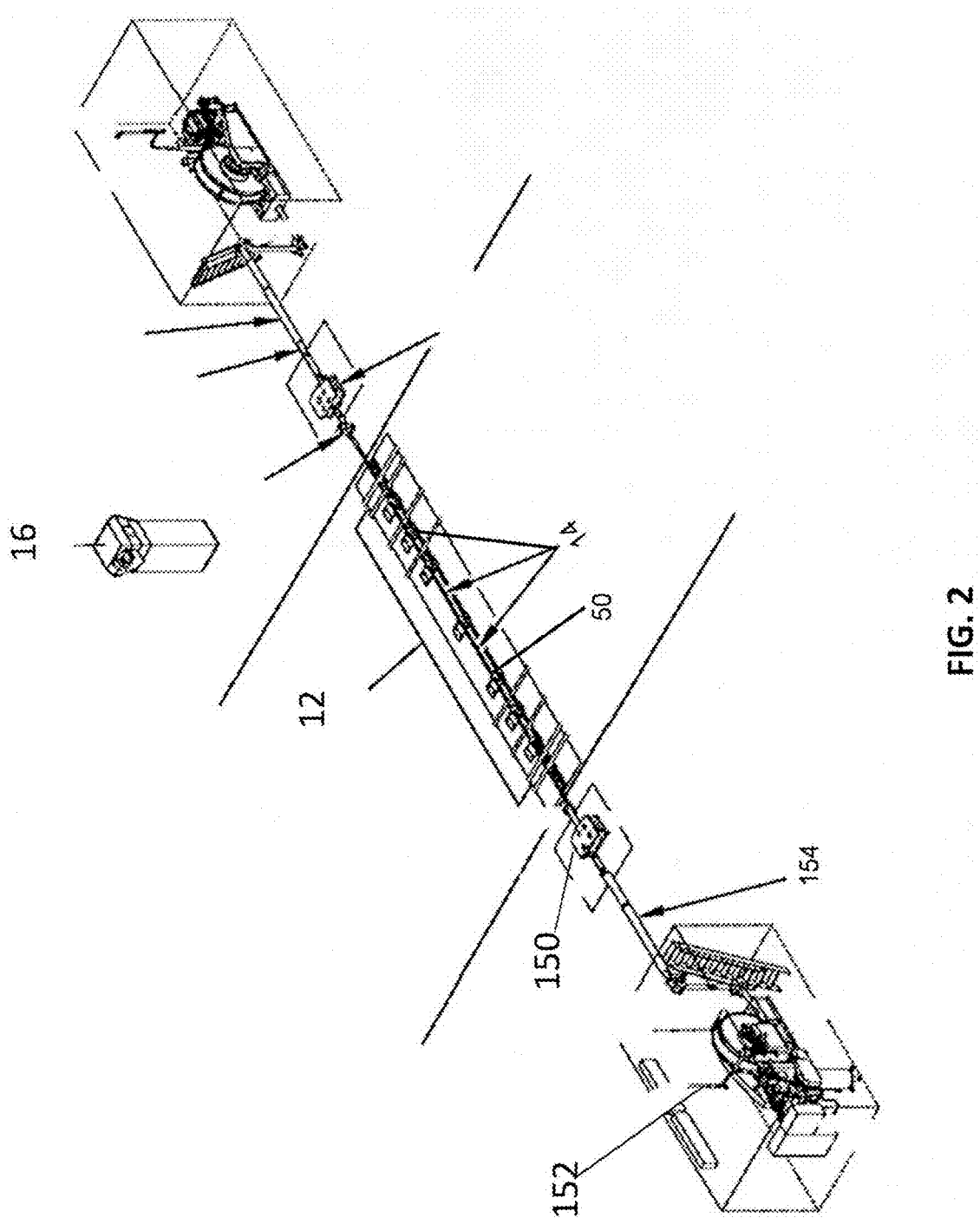
FIG. 2 illustrates the system of FIG. 1 with additional system components.
Figure 3:
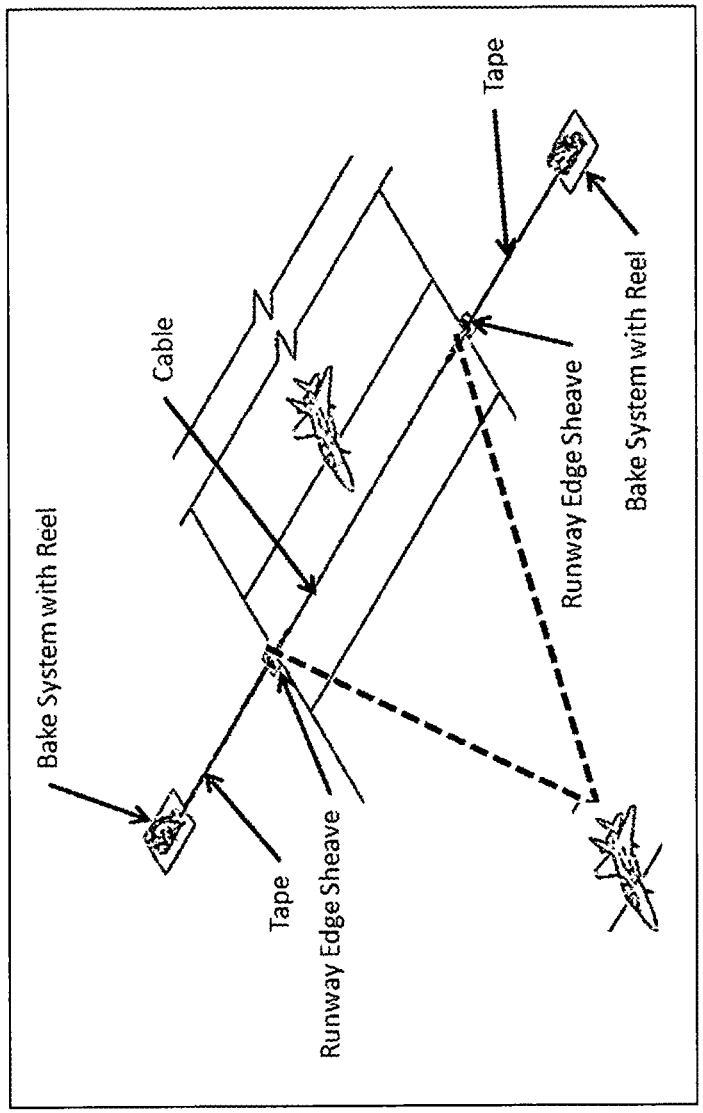
FIG. 3 illustrates a schematic view of an aircraft with a tailhook catching a cross-runway pendant cable.
Figure 4:
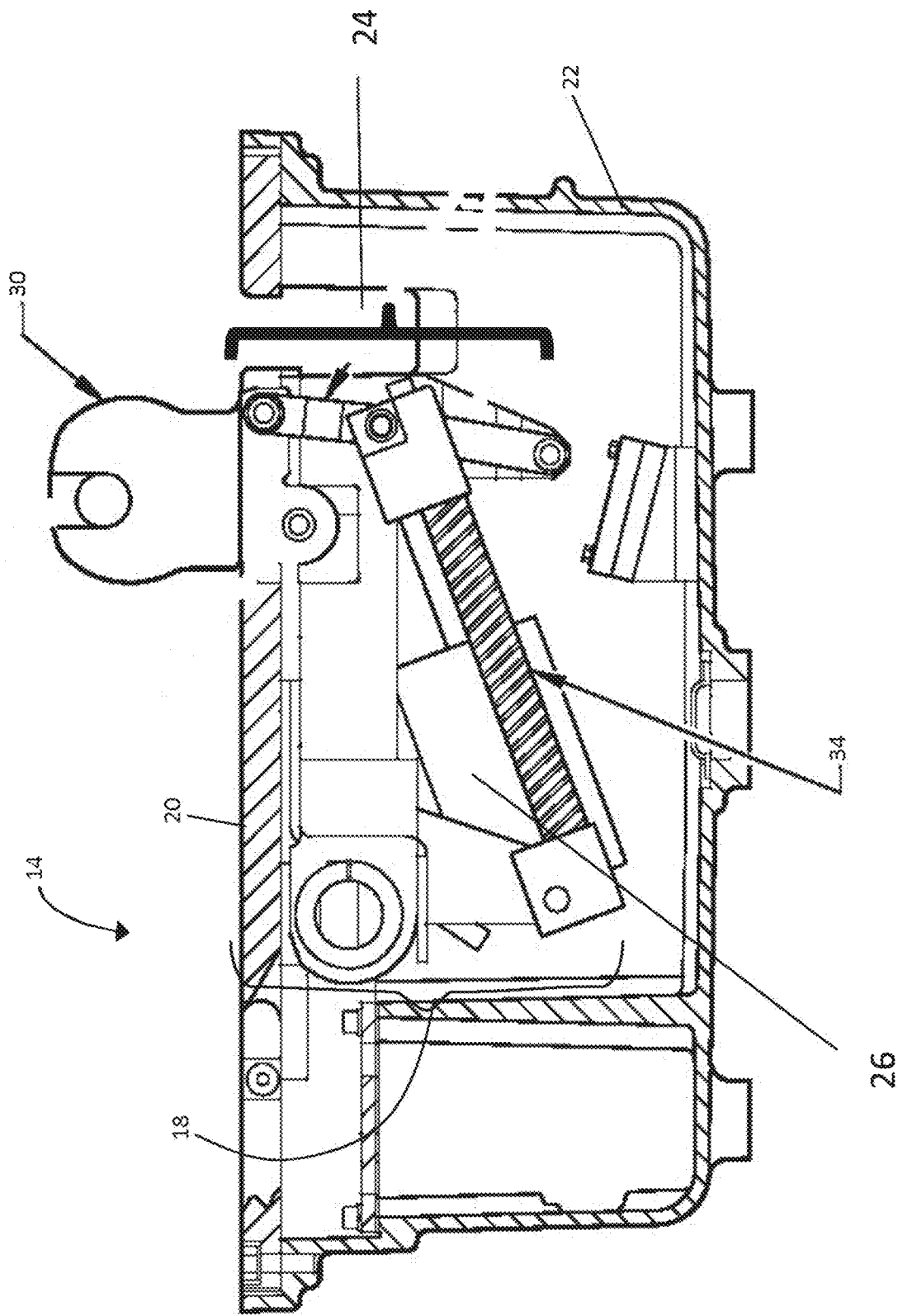
FIG. 4 is a side plan view of a prior art arresting cable retraction mechanism, positioning the cable in a raised/battery/ready position.
Figure 5:
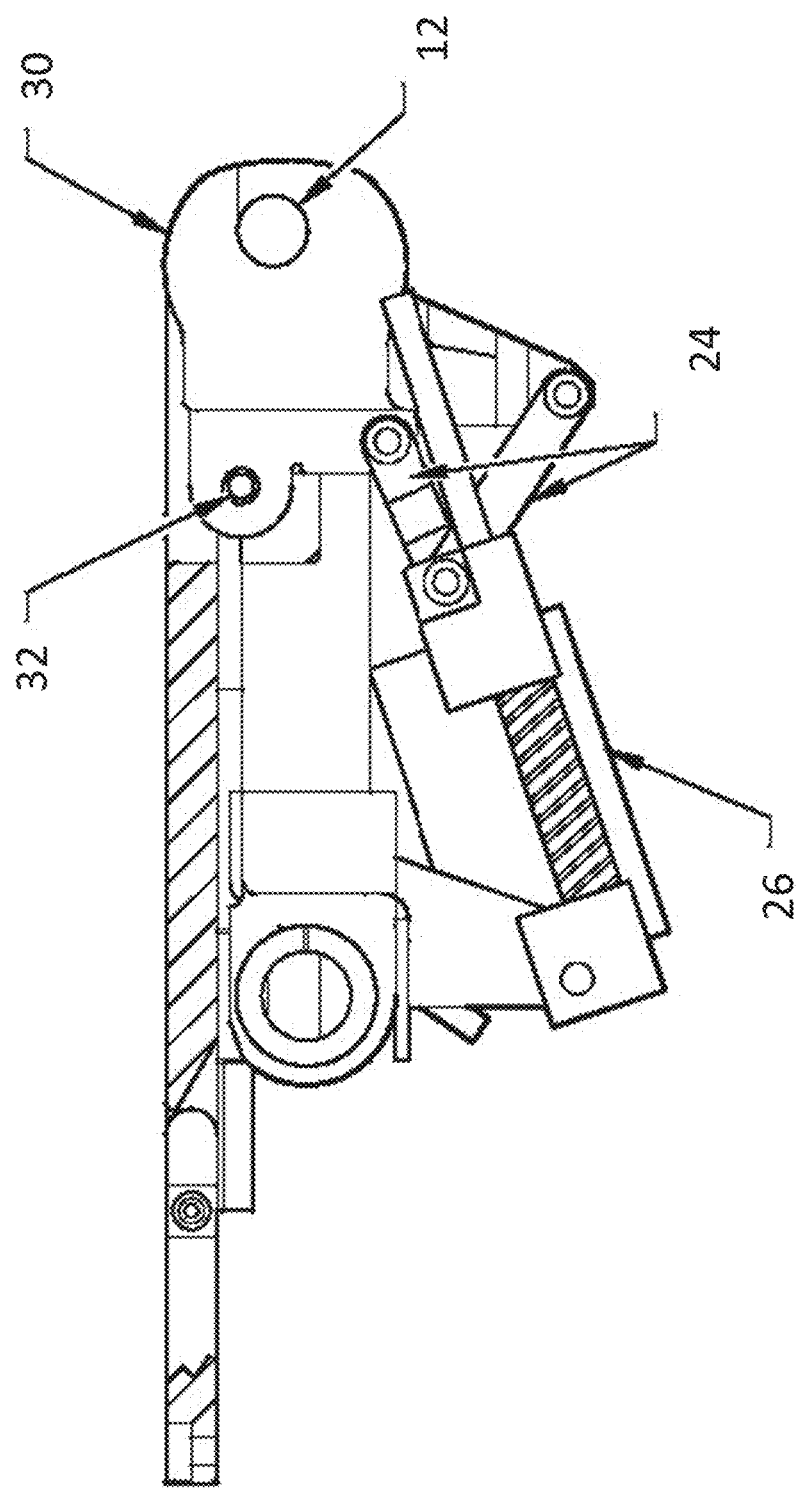
FIG. 5 is a side plan view of the arresting cable retraction mechanism of FIG. 4, positioning the cable in the retracted position.
Figure 6:
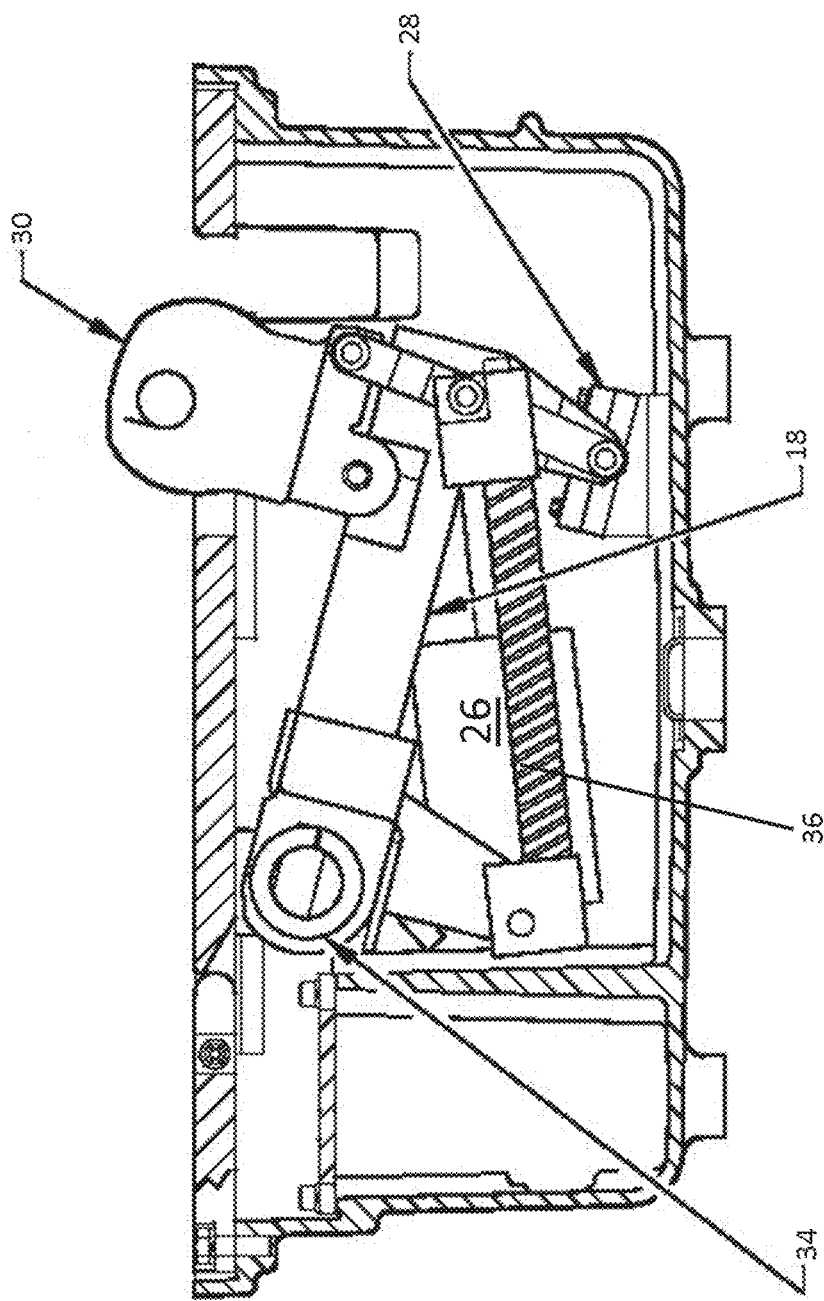
FIG. 6 is a side plan view of the arresting cable retraction mechanism of FIG. 4, positioning the cable in the rollover position.

As background, the most common current arresting cable retraction mechanism 14 in use is referred to as a BAK-14M, one example of which is shown in FIGS. 4-6. This mechanism 14 consists of a single assembly, called a support arm 18, which is mounted to a cover plate 20 and that rests within a support box 22. The support box 22 is mounted below the runway surface, and the cover plate 20 is flush with the runway surface. The support arm 18 includes components required for the retraction process, including a linkage assembly 24 and a motion actuator 26. The support arm 18 also includes a cable support block 30, which extends above the support box 22 and is used to secure a cross-runway cable above the runway. FIG. 4 illustrates the cable support block 30 in a cable raised position. Actuation of the motion actuator 26 causes retraction movement of the linkage assembly 24 (which is generally formed as two toggle links as shown), which moves the cable support block about a pivot point 32, retracting the cable support block 30 as illustrated by FIG. 5. This action will occur when the cable support block should be retracted into the runway trough.

When an aircraft rolls over the cable support block 30, the entire support arm 18 deflects to the rollover position shown in FIG. 6. In this example, the support arm 18 is forced downwardly. A torsion spring 34 is provided along a support arm shaft that adds deflection capability of the support arm 18. The support arm, which carries the motion actuator 26, moves down to impact the down stop bumper 28. The torsion spring 34 may also help absorb impact energy. A compression spring 36 helps return the linkage assembly 24 and the motion actuator 26 to their battery position. Once the aircraft wheels have rolled over the support arm 18/cable block support 30, potential energy of the torsion spring 34 returns the support arm 18/cable block support 30 back up to the raised position of FIG. 4.

Incorporating the components required for the retraction process in association with the support arm 18, which is also the component that deflects during a rollover event, can increase the mass of the support arm 18, which in turn can increase the force experienced by the retraction components (F=ma). Additionally, the motion actuator 26 and other retraction components experience the shock of every aircraft rollover event, further contributing to system damage.

Military procedures often require that the cross-runway cable be up and ready any time that an aircraft equipped with a tailhook is landing. Accordingly, the arresting cable retraction mechanism(s) potentially experience the force of aircraft wheels due to rollover during every landing. Also, during an aircraft rollover event, the inventors have identified that cross-runway cable should not move below the runway surface as it would during a retraction command. The cross-runway cable should remain above the runway surface during an aircraft rollover, in the event that a tailhook engagement is required. Failure of the cross-runway cable to maintain its position above the runway surface can create the possibility of a hook skip or failure of the aircraft tailhook to engage the arresting system entirely.

The described embodiments thus provide an arresting cable retraction system 40 that separates the retraction assembly arm from the rollover/deflection components. The retraction assembly arm supports the components that raise the system's cable support block in order to position the pendant cable in its battery position above the runway and which lower the system cable support block and cable to its retracted position in order to position them the either flush or below the with runway or in a retracted position within a trough of the runway. The deflection components support the components that allow the cable support block to lower during a rollover event but spring back up to its ready position as soon the aircraft wheels have passed. Separating the system components from one another provides a more robust and reliable system.

Figure 7:
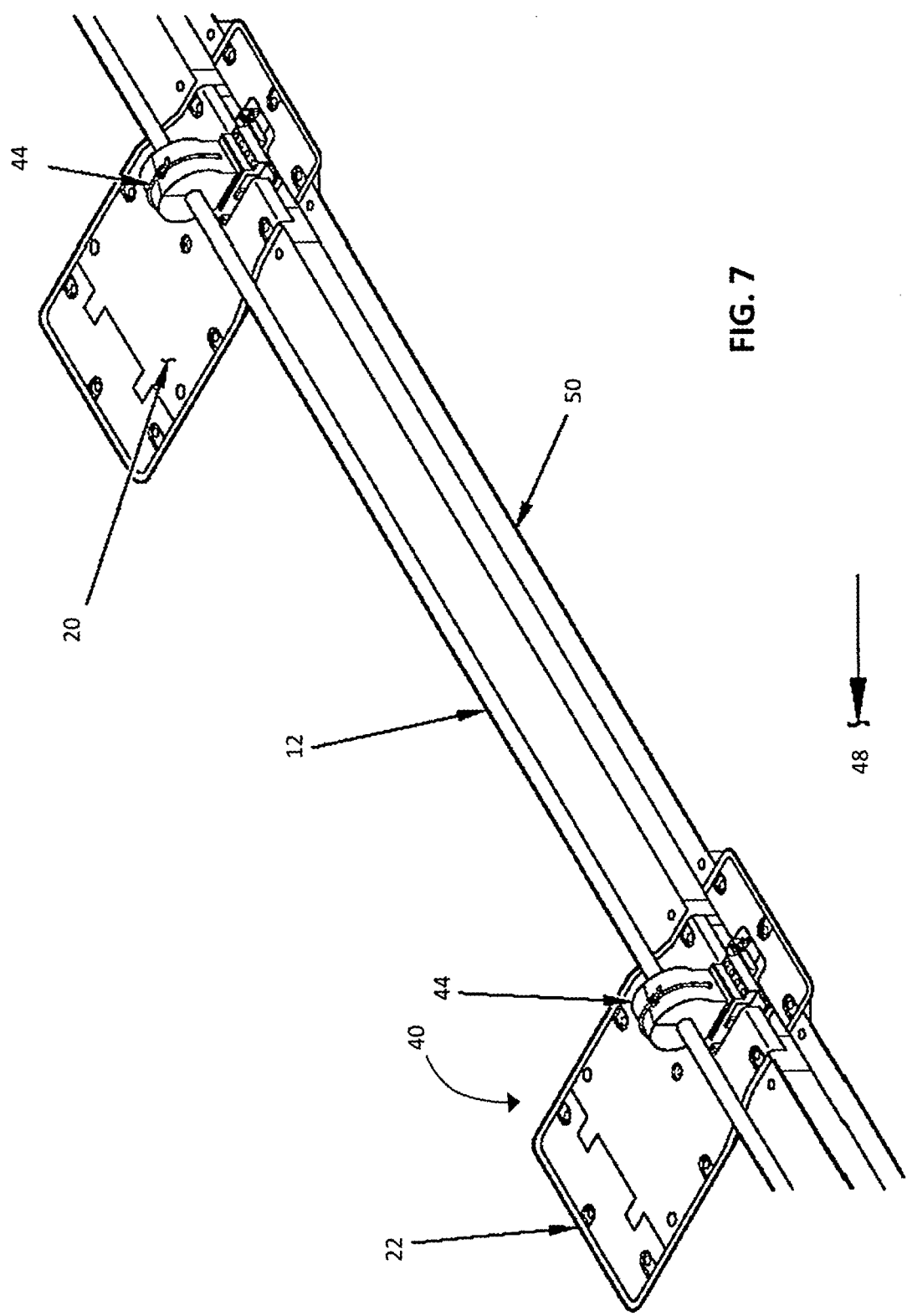
FIG. 7 is a side perspective view of one embodiment of an arresting cable retraction system of this disclosure.

Referring now to FIG. 7, the system 40 may be contained within a support box 22 that is mounted below a runway surface. It is possible for the disclosed system 40 to be used with a currently-installed (and/or prior art) support box 22, such that the system 40 is retrofittable. This allows the system 40 to be installed into an existing retraction mechanism installation without the need for additional runway civil work or extensive excavation efforts. Existing electrical power, motion control, and/or sensing capabilities of an existing system may be used without modification. FIG. 7 shows a support box 22 mounted with respect to an aircraft runway surface 48. The runway 48 is designed with a trough 50 that extends the length of the runway surface 48. When the system 40 is not in use, retraction mechanism system components (described in detail below) may be used to lower the cable 12 into the trough 50. When in a raised position, the cable 12 extends through a cable support block 44. When in a lowered position, the cable support block 44 is retracted/rotated forward such that the cable 12 can be received into the trough 50.

Figure 8:
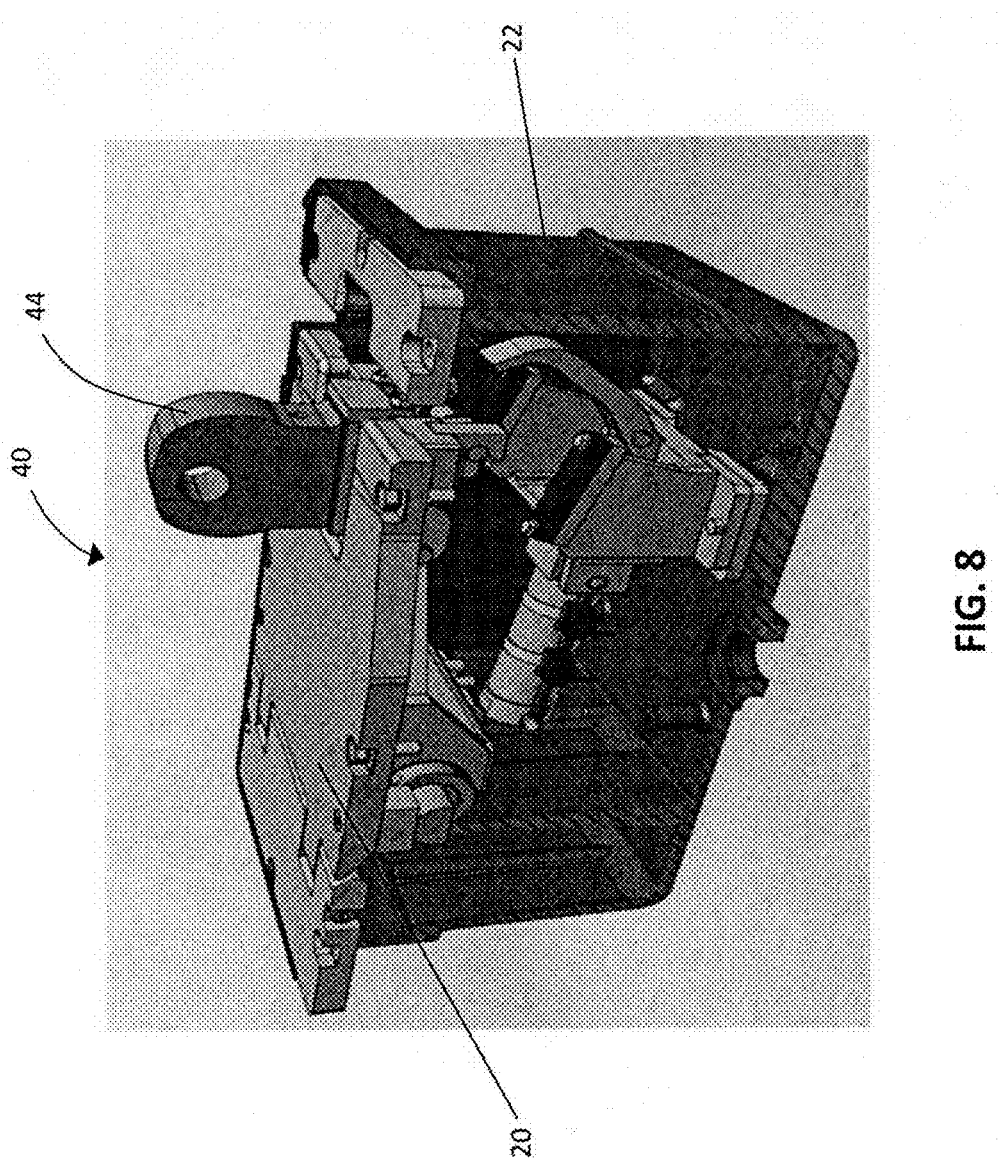
FIG. 8 is a side perspective view of an arresting cable retraction system in position within a support box, positioning the cable in a raised/battery/ready position.
Figure 9:
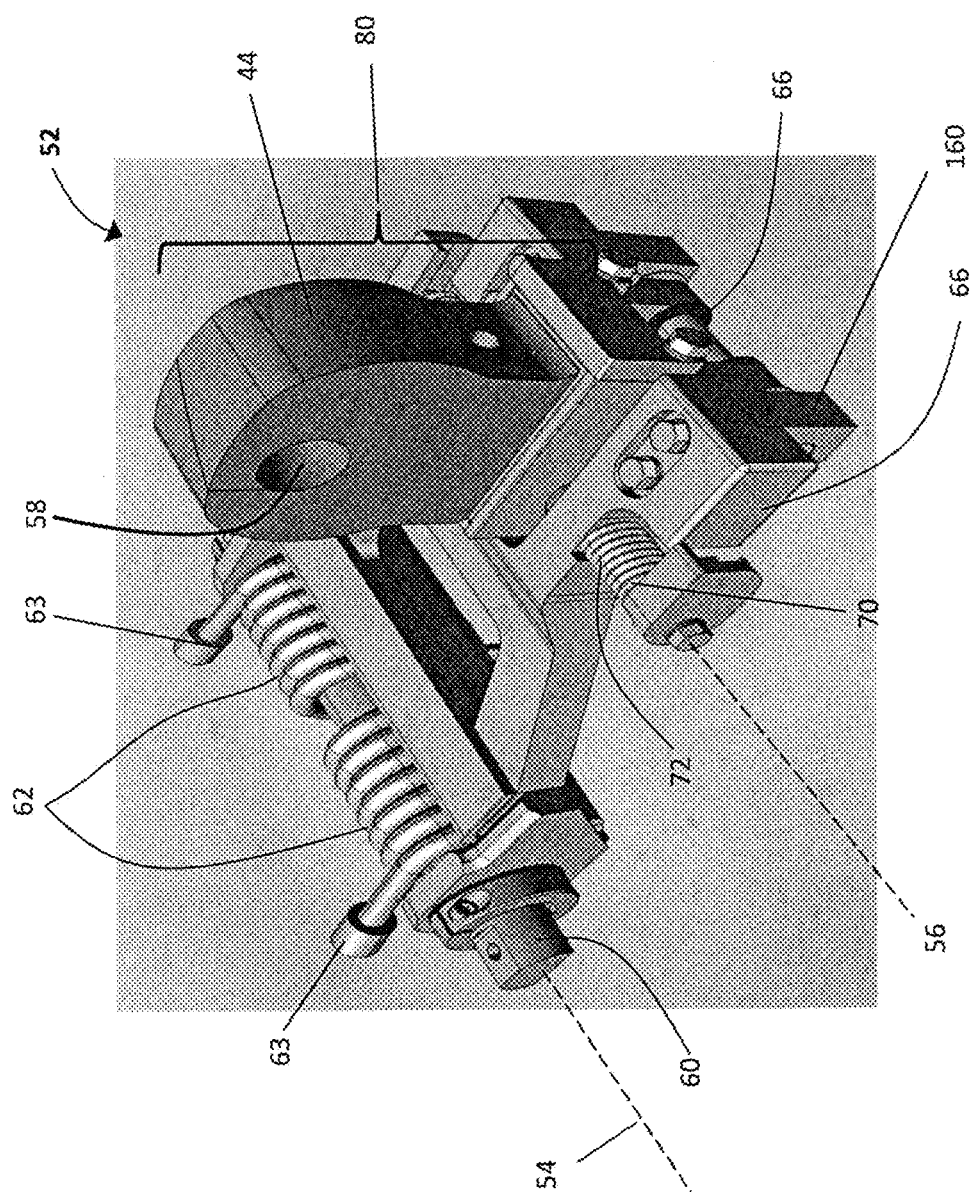
FIG. 9 is a side perspective view of one embodiment of a support arm assembly for use in connection with the disclosed arresting cable retraction system.
Figure 10B:
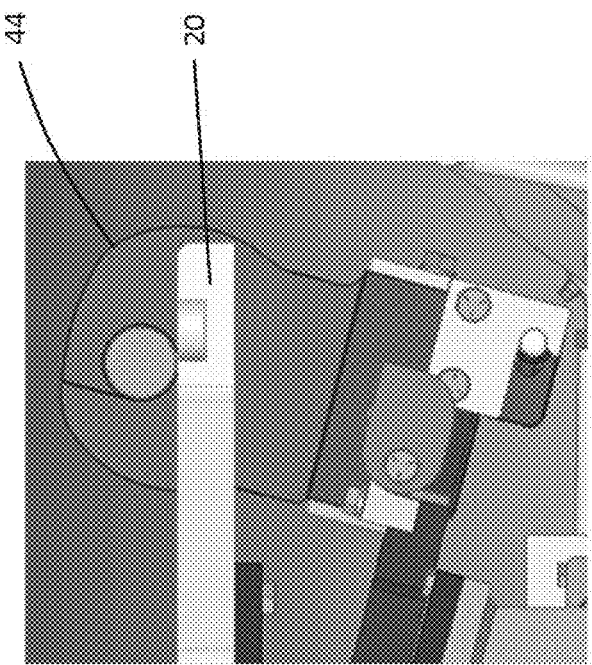
FIG. 10B is a side plan view of movement of the cable support block assembly and support arm assembly during a rollover.
Figure 10A:
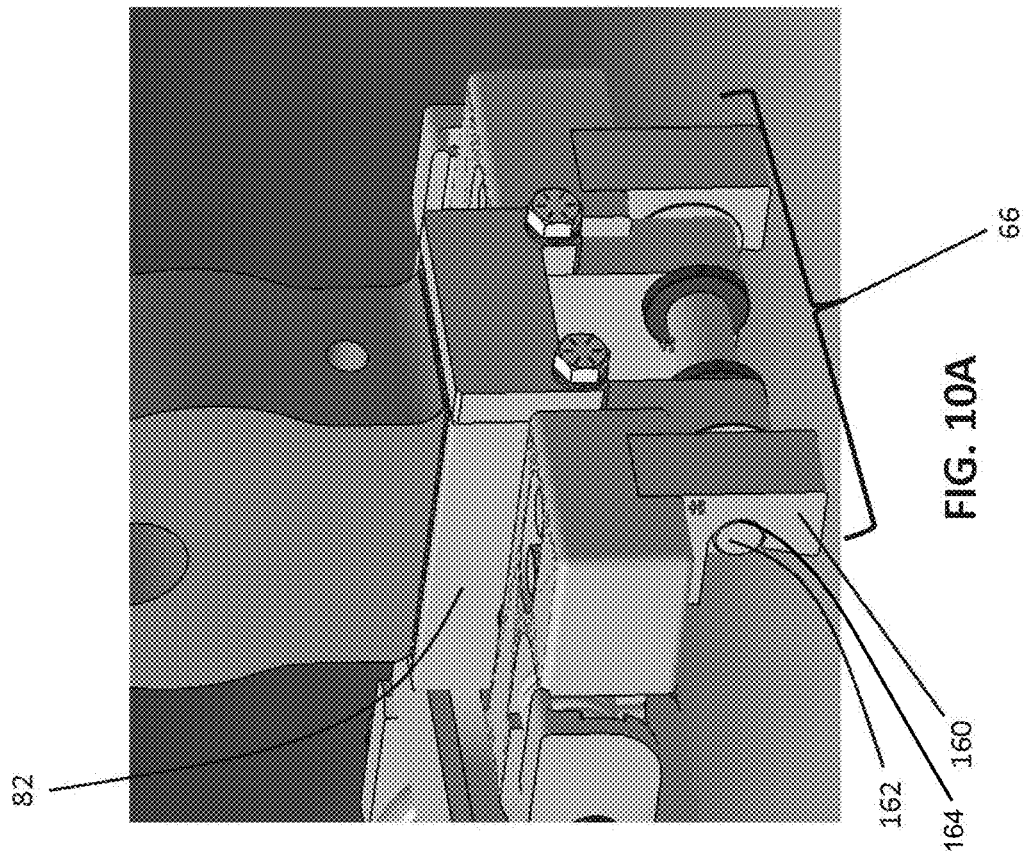
FIG. 10A is a front perspective view of a cable support block assembly locked in position with respect to the support arm assembly.

The system 40 operates in three primary positions. FIG. 8 illustrates the system 40 in the battery position, which is the system in a raised position. The cross-runway cable will be mounted within the support block 44 above the runway surface and is ready for an aircraft tailhook engagement if needed. FIG. 9 illustrates the support arm assembly 52 of the system 40. FIG. 10A illustrates a close up view of the support arm 52 in a locked configuration. FIGS. 10B and 11 illustrate the system support arm 52 in the rollover position, which is the system in the deflected position. This position is achieved when an aircraft tire impacts the support block 44, causing the assembly to deflect and rotate under load in order to absorb the impact energy. In this position, the cross-runway cable remains above the runway surface. Not allowing the cross-runway cable 12 to recede below the runway surface, even in this deflected position, helps prevent a hook skip. (A hook skip is the failure of the aircraft to engage the cable when needed.)

Figure 12:
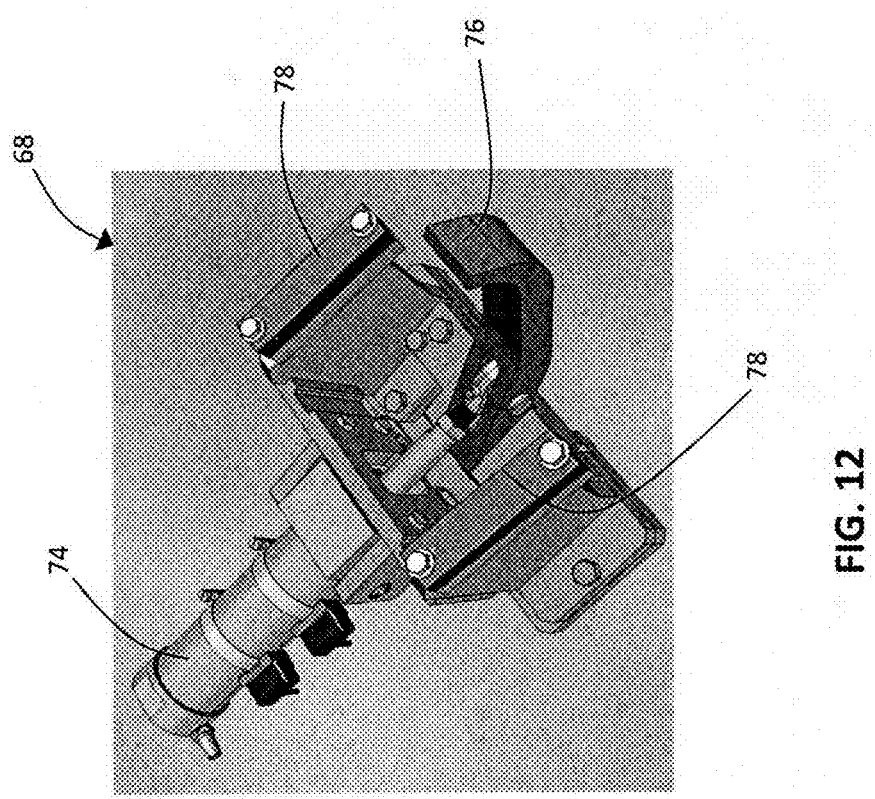
FIG. 12 is a top perspective view of one embodiment of a retraction arm assembly for use in connection with the disclosed arresting cable retraction system.
Figure 13:
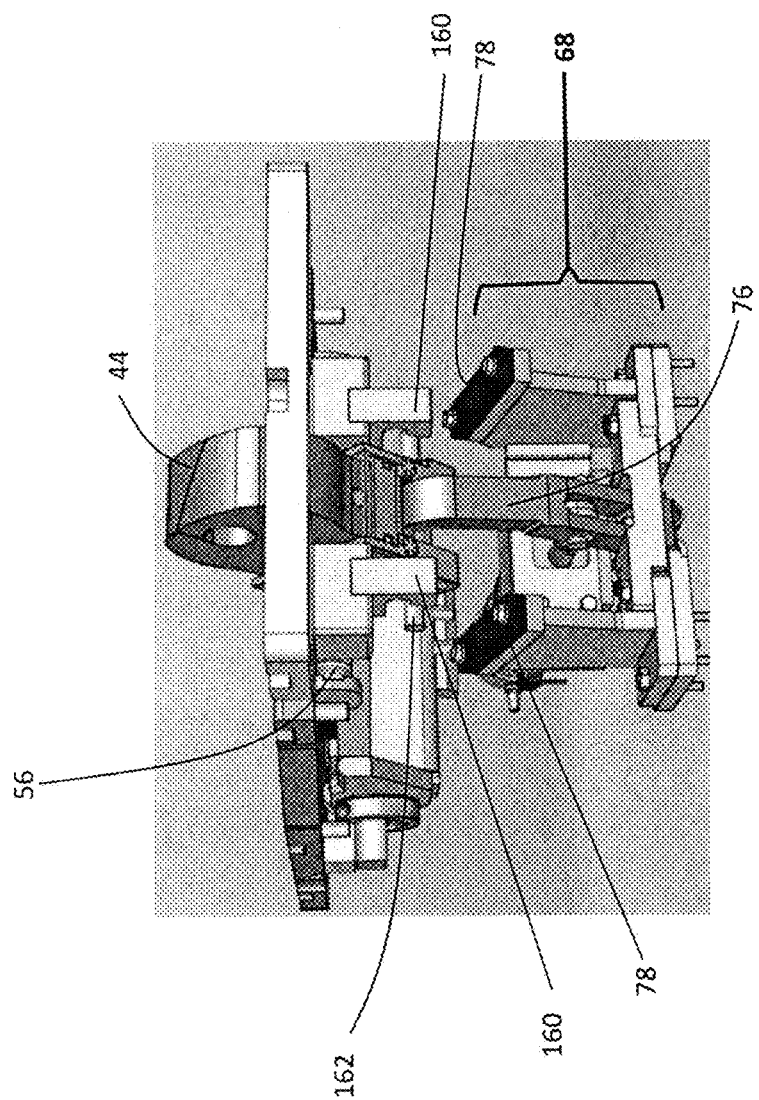
FIG. 13 illustrates a front perspective view of the retraction arm assembly engaging and releasing the lock mechanism, allowing retraction of the support block assembly with respect to the support arm assembly.
Figure 14:
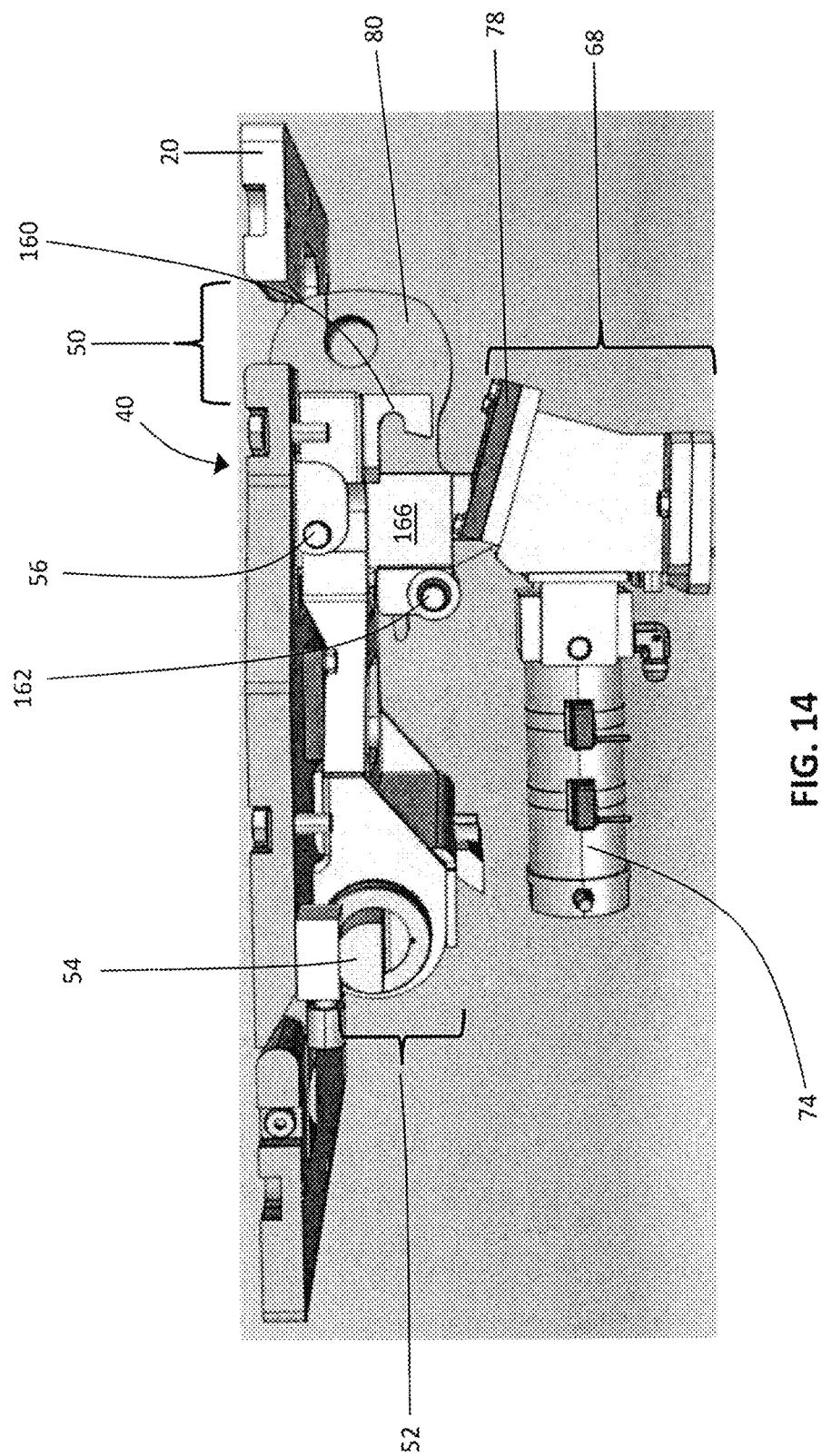
FIG. 14 shows a side perspective view of the disclosed arresting cable retraction system in a retracted position.

FIG. 12 illustrates the retraction assembly 68 of the system 40. FIG. 13 illustrates a midway step in the retraction of the system 40, and FIG. 14 illustrates the system in a fully retracted configuration. In this position, the cross runway cable 12 lies beneath the cover plate 20 (which is flush with the aircraft runway surface 48) and can be positioned within the trough, creating an obstruction-free runway. This position may be used when the runway is not in use by tailhook equipped aircraft and the cable is not required to be accessible. Reference will now be made to these figures and the components that coordinate the rollover event as distinct from the retraction event.

The movement of the cable support block 44 is controlled via a support arm assembly 52, illustrated by FIGS. 9 and 10, and a retraction assembly 68, illustrated by FIG. 12. These components work together in order to cause the described types of movement of the cable support block 44, and consequent movement of the cross-runway cable 12.

Figure 15:
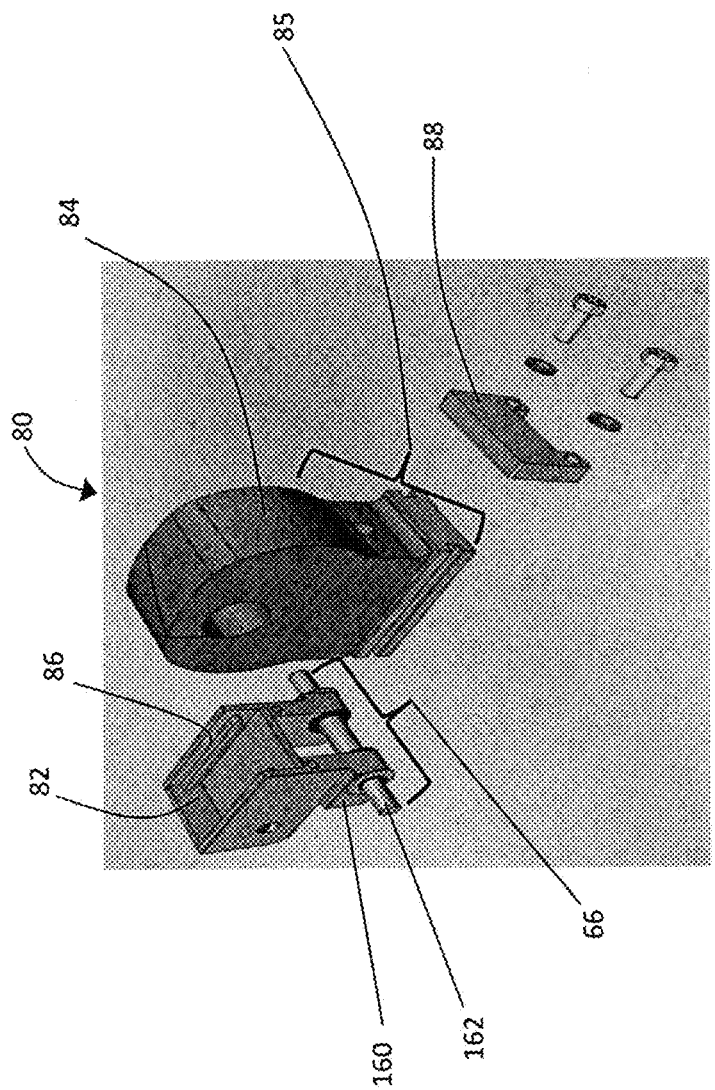
FIG. 15 shows an exploded view of one embodiment of a modular cable support block.

FIGS. 9 and 10 illustrate the support arm assembly 52, which is also shown in combination with other system components by FIGS. 11 and 13-14. The support arm assembly 52 contains multiple axes of rotation. A first axis of rotation 54 provides for rotation of the support arm assembly 52 during rollover (illustrated by FIGS. 10B-11). This first axis 54 allows the support arm 52, including the cable support block 44, to absorb the energy applied during rollover impact. A second axis of rotation 56 provides for rotation of the cable support block 44 and its related components (which may be referred to collectively as a support block assembly 80 as illustrated by FIG. 15) during retraction (illustrated by FIGS. 13-14). This second axis 56 allows the support block assembly 80 to rotate below the surface of the runway. Providing these two different axes of rotation prevents the retraction components from receiving excessive force during high-speed rollovers. The functioning of these different axes of rotation will be described in more detail below.

Referring more specifically to FIG. 9, the support arm assembly 52 may be secured to a cable support block assembly 80. The cable support block assembly 80 includes a cable support block 44 with a cable receiving opening 58. This opening 58 receives and supports a cross-runway cable 12 in use, as shown by FIG. 7. The cable support block assembly 80 also includes a housing 82 which supports a lock mechanism 66 and a retention plate 88. (FIG. 15 illustrates one embodiment in which these components of a cable support block assembly 80 are modular and is described in more detail below. It should be understood however, that modularity is not required.) As illustrated by FIG. 10A, the lock mechanism 66 may be defined by side lock blocks 160 on the support arm assembly 52 and a lock pin 162 of the housing of the support block assembly 80. As illustrated by FIGS. 10A and 10B, lock blocks 160 are provided with a curved rear face 164 that is configured to receive the lock pin 162. When the lock pin 162 is engaged in the side lock blocks 160 as shown, the support block assembly 80 is rigidly secured to and moves with the support arm assembly 52. This collective movement is illustrated by the rollover event shown in FIGS. 10A and 11.

Referring back to FIG. 9, the support arm assembly 52 also has a main shaft 60 which defines the first axis of rotation 54. Associated with the main shaft are one or more rollover torsion springs 62. The main shaft 60 and the one or more rollover torsion springs 62 to provide the support arm assembly 52 with the ability to be deflected into the support box 22, as shown by FIGS. 10B and 11 during a rollover event. The one or more rollover torsion springs are wound around the main shaft 60. The spring(s) 62 may have rear supports 63 that extend generally parallel to a support box cover plate 20. The rear supports 63 help provide a counter lever support against the cover plate 20 during rotation of the support arm assembly 52 about the main shaft 60. This is illustrated by FIG. 11. In this figure, the lock pin 162 is engaged, such that the support block assembly 80 and the support arm 52 are secured to one another and move as a single unit.

When rollover pressure is applied to the cable support block 44 (e.g., in the form of force from aircraft wheels), it causes the support arm assembly 52 to rotate down and pivot with respect to the main shaft 60, moving from the position illustrated by FIGS. 9 and 10A to the position illustrated by FIGS. 10B and 11. The cable support block 44 is depressed downwardly with respect to the cover plate 20, such that it lowers partially into the support box 22. The main shaft 60 is positioned in the rear of the support arm assembly 52. The torsion springs 62 absorb some of the energy of the aircraft wheel pressure. Pivoting about the first axis 54 continues until the abutment members 166 of the support arm assembly 52 contact the downstop bumper 78 located on the retraction assembly 68 (FIG. 12 illustrates the retraction assembly 68 on its own, and will be described in more detail below). It is important to note that during a rollover event, the cable 12 does not retract into the trough 50. Instead, it remains above the runway surface, as illustrated by the rollover position of FIG. 11. In prior art systems, there has been the possibility that the cable could catch in the trough and not be in battery position during a tailhook event. However, in this disclosed system, the cable 12 does not rotate into the trough because the support block 44 and its related components (assembly (80) is restrained from rotating with respect to any other components of the support arm assembly 52 by the locking mechanism 66. The geometry is such that as the support arm 52 rotates on axis 54 during a rollover, and the support block is prevented from pivoting on axis 56 due to the lock between the support block assembly 80 and the support arm assembly 52. The cable 12 can come down flush on the top cover 20 and there is insufficient arc for the cable to get pushed into the trough. The stop defined by the support arm 52 abutment members 166 and the downstop bumpers 78 can also help prevent the cable 12 from retracting further.

Figure 16:
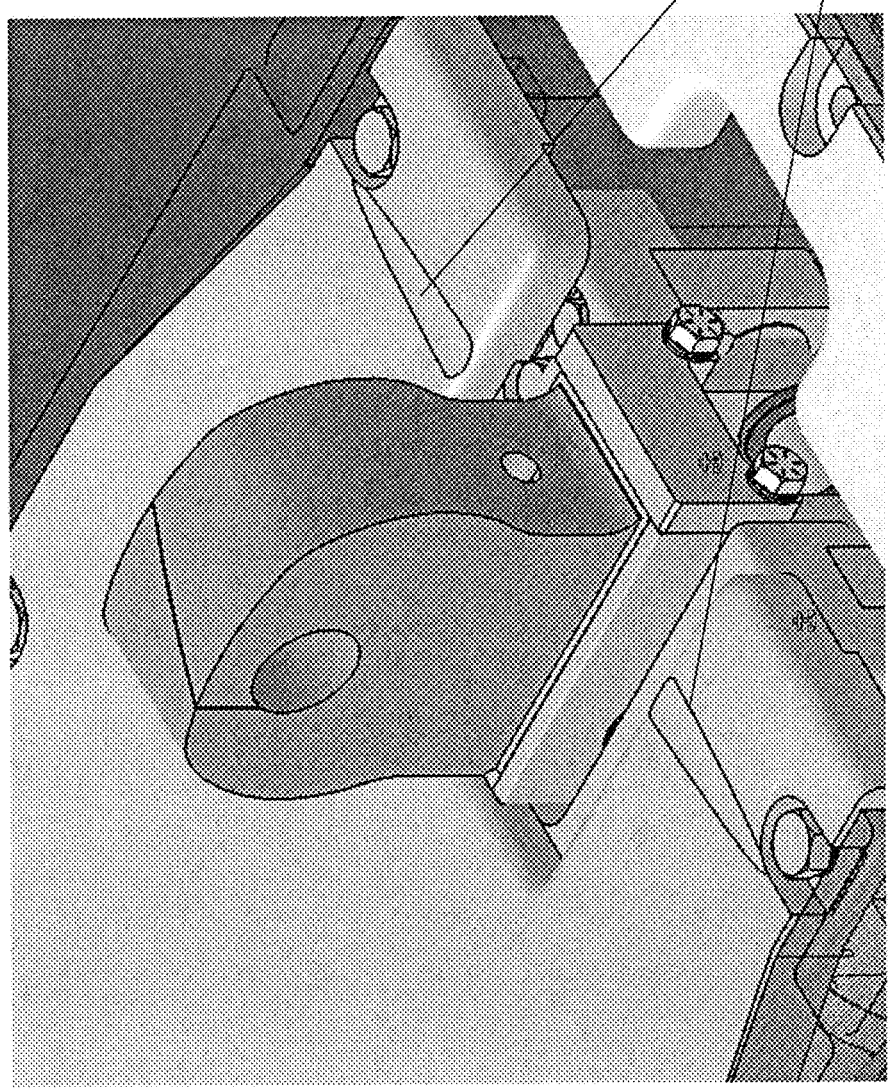
FIG. 16 shows a top perspective view of a cover plate with a scalloped cable-receiving portion.

In one example, it is possible to provide a scalloped shape along the cable 12 where it impacts the cover plate 20 of the support box 22. In another example, it is possible to provide a scalloped shape 168 along the cover plate 20, in order to provide an area for the cable 12 to rest. One example is illustrated by FIG. 16. This cable relief indentation may alleviate damage caused by a scissoring motion between the cable 12 and the cover plate 20 during an aircraft rollover.

The described deflected configuration is only maintained upon pressure from the aircraft wheels during the rollover. The torsion spring(s) 62 absorb a portion of the rollover force. Once pressure from the rollover wheel force is released from the cable support block 44, potential energy of the torsion spring 62 causes the support arm assembly 52 (with the locked cable support block assembly 80) to spring back up to the battery position of FIGS. 9 and 10A. This ensures that the cable support block 44 supporting the cable 12 is back up in time to present the cable 12 to an aircraft tailhook if necessary. This spring release can be analogized to the metal spikes positioned along one way entry barrier. Once the wheels of a vehicle have rolled over the spikes, they are allowed to spring back up into their ready position.

Reference will now be made to FIGS. 12-14 in order to describe retraction of the cable support block 40. Retraction occurs along the second axis of rotation 56 of the support arm assembly 52. During retraction, the cable support block assembly 80 is unlocked or otherwise released from the support arm assembly 52 via release of the lock mechanism 66. Retraction moves the cable support block assembly 80 but not the support arm assembly 52. The support arm assembly 52 remains stationary and does not pivot or rotate about the first axis 54 within the support box 22 during retraction. The second axis of rotation 56 allows movement of the support block assembly 80 with respect to the support arm assembly 52. A comparison between the rollover configuration of FIG. 11 and the retraction configuration of FIG. 14 helps illustrate which axis of rotation is active.

The second axis of rotation 56 of the support arm assembly 52 is used for retraction. This is the process of retracting the cable support block 44 entirely below the runway surface 48 and into the trough 50 for storage or non-use. This is distinct from the rollover deflection described above. As shown by FIG. 9, the second axis of rotation 56 is defined by a support block shaft 70. The support block shaft 70 is associated with one or more a support block torsion springs 72. The support block shaft 70 is the pivot shaft for the support block assembly 80 during retraction. When retraction is to occur, the lock mechanism 66 between the support block assembly 80 and the support arm assembly 52 is released, as described in more detail further below.

Referring now to FIG. 12, the retraction arm assembly 68 is provided with a motion actuator 74 and a retraction arm 76. The retraction arm assembly 68 is also provided with one or more downstop bumpers 78, which are as described above. The motion actuator 74 may be a pneumatic actuator, a mechanical actuator, or any other type of motion actuator that may be used to raise and lower the system 40. The retraction arm assembly 68 does not move during rollover deflection but does provide some dampening to abutment members 166 through the downstop bumpers 78. The retraction arm assembly 68 is activated only during retraction of the support block assembly 80, which functions to move the cable 12 into the trough 50.

When a retraction command is issued (e.g., which may be from the control tower 16), the retraction arm 76 disengages the lock mechanism 66 of the support arm assembly 52. As illustrated by FIGS. 12-13, actuation of the motion actuator 74 moves the retraction arm 76 from its released/disengaged position (of FIGS. 11 and 12) to its engaged position of FIGS. 13 and 14. The retraction arm 76 applies pressure to the lock pin 162 in order to force the lock pin 162 out of the curved face 164 of the lock blocks 60. Release of lock pin 162 decouples the cable support block assembly 80 from the support arm assembly 52. Independent rotation of the cable support block assembly 80 about the second axis 56 allows its retraction. After the lock mechanism 66 is disengaged, the retraction arm 76 works against upward pressure from the torsion springs 72 to pull/pivot the cable support block assembly 80 about the support block shaft 70/second axis 56 into the retracted position, as illustrated by FIG. 14. The lock mechanism 66 thus enables the system 40 to have multiple axis of rotation, while only using the one required for a particular operation. When in a locked configuration, the cable support block assembly 80 and the support arm assembly 52 are locked to one another such that the support arm assembly absorbs the energy of a rollover. When the lock mechanism 66 is in an unlocked configuration, the cable support block assembly 80 is permitted to pivot with respect to the support arm assembly such that the motion actuator 74 and the retraction arm 78 of the retraction assembly retracts the support block assembly 80 (and the cable contained within it) into the support box 22 in order to clear the runway surface.

For example, when the lock mechanism 66 is engaged in a locked configuration (and the retraction arm 76 is disengaged), the support arm assembly 52 is able to rotate on the main shaft 60/first axis 54 for rollover deflection. The locked configuration does not transmit any force to the motion actuator 74 or the retraction arm 76 of the retraction arm assembly 68, preventing them from experiencing impact loading imparted by high-speed rollover forces. When the lock mechanism 66 is disengaged by the retraction arm 76, the cable support block assembly 80 is allowed to rotate with respect to the support block shaft 70/second axis 56 by the continued motion of the retraction arm 76, in order to move the cable support block assembly 80 into a lowered position.

These multiple points of rotation allow the system 40 to absorb the aircraft rollover energy and retract the system using two unique motion paths. This is necessary in order to ensure that the cable 12 does not recede into the runway trough 50 during an aircraft rollover. This is also necessary in order to ensure that a rollover event does not damage the motion actuator 74 and retraction arm 76. Accordingly, the motion actuator 74 and retraction arm 76 remain stationary (along with the retraction arm assembly 68) during a deflection rollover event.

FIG. 15 illustrates a modular option for a modular cable support block system 80, and shows the below described components in an exploded view. It should be understood, however, that these components may be formed as a single component if desired. The modular version allows for quick and easy replacement of the support block 85 itself without requiring replacement of the support block housing 82 or any other system components. This can be useful because the cable support block is the system component that has the potential to receive the most damage due to aircraft wheel rollover. In order to exchange the cable support block 85 without removing the remainder of the components, the modular system of FIG. 15 may be provided. For example, the modular support block 85 may be secured with respect to housing 82 via insert grooves 84 that are positioned along the base of the modular support block 85 that cooperate with corresponding tracks 86 of the housing. These components could be reversed so that the cooperation is vice versa. It is possible to dovetail/slide the components 85, 82 with respect to one another for securement of the modular support block 80 with respect to the housing 82. The general concept is that the module support block 85 may be removably secured to the housing 82. It may be removed and replaced if needed without removing the entire system from the support box.

FIG. 15 also illustrates the lock mechanism, shown as a lock plate 88, that secures the modular support block 85 to the housing 82. The lock plate 88 is secured with respect to the cable support block housing 82. For removal of the modular support block 85, the lock plate 88 may be removed, and the support block may slide out from the housing 82.

In the described invention, the lock mechanism 66 is shown and described as a rod restrained within a slot on the support arm assembly 52 that maintains its position in the locked position via springs that force it into a curved face 164 of the lock block 160. However, the locking functionality can be achieved using designs that include pins, keys, actuating components, slides, etc. and should not be limited to specific lock mechanism described. The general concept is to maintain the support block assembly 80 in a secured position with respect to the support arm assembly 52 in order to prevent aircraft wheel rollover forces applied to the cable support block assembly 85 from extending to the motion actuator components contained in the retraction assembly 68.

When the tower or site wishes to raise the system back up to the battery position, the motion actuator 74 extends, releasing the retraction arm 76 from the lock mechanism 66. The support block torsion spring(s) 72 located on the support block shaft 70 provide the force to return the cable support block assembly 85 to the battery position. This also re-engages the spring loaded lock mechanism 66 so that the system is in position for an aircraft rollover event. Both lock mechanism disengagement and support block retraction is accomplished using the motion of the retraction actuator 74 and retraction arm 76, of the retraction arm assembly 68.

Figure 18:
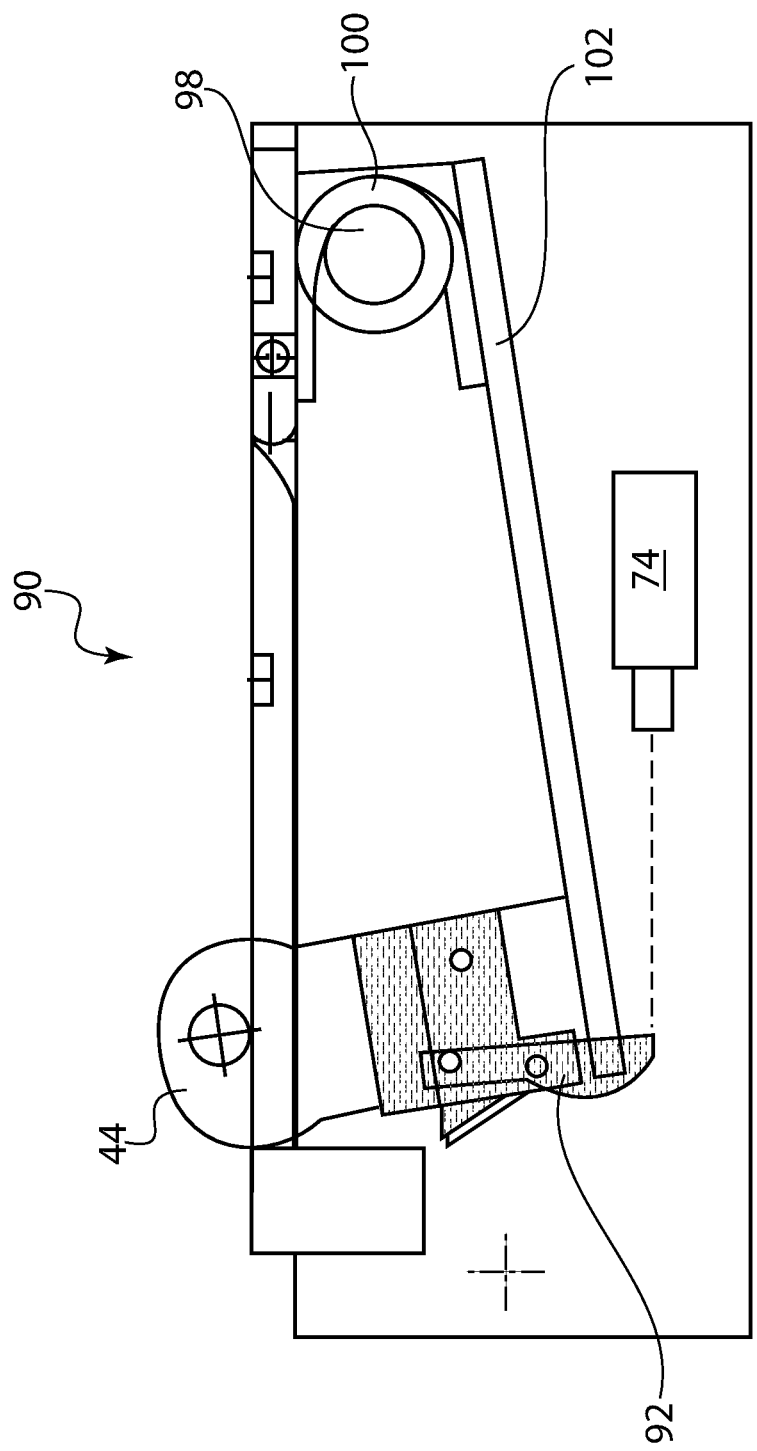
FIG. 18 shows the mechanism of FIGS. 17A-17C in a rollover position.

FIGS. 17A-C and 18 illustrate an alternate embodiment of a retraction/rollover mechanism 90. As with the above discussed system, the system of these figures also provides two axes of rotation for the support block 44. A first axis of rotation 96 is for a latch lock 92. The latch lock 92 pivots about this axis 96 until it comes in contact with a latch plate 104, which stops it from rotating further. At that point, the support block 44 rotates about a second axis 180. This rotation causes the support block 44 to retract into the trough, as illustrated by FIGS. 17A-C. Referring now to FIG. 18, a third axis of rotation 98 allows the support block 44 to experience rollover without impacting the motion actuator 74, which may be a pneumatic cylinder or any other appropriate type of actuator.

FIG. 17A illustrates the retraction/rollover mechanism 90 in its raised and locked position, holding a pendant cable 12 in a battery position. In this example, the support block 44 has a latch lock 92. As illustrated by the transition between FIGS. 17A and 17B, the latch lock 92 is translatable between an upright locked position (FIG. 17A) and a translated unlocked position (FIG. 17B). Movement between the locked and unlocked position is managed via a cable 94 (which may also be a cord, a wire, a link, or other type of retractable mechanism that can couple the latch lock 92 to a motion actuator 74). One end of the cable 94 is secured to the latch lock 92 and a second end of the cable 94 is secured to the motion actuator 74. When the motion actuator 74 is activated, the cable 94 is pulled, which consequently pulls the latch lock 92 in order to cause its translation. Release of the locking latch 92 then allows further retraction of the cable 94 via the motion actuator, which pulls/rotates the cable support block 44 down into the cable trough 50. This retracted position is shown by FIG. 17C. This rotation takes place around the second axis 108, as illustrated by FIG. 17C. The support arm 102 remains in the same position during the entire retraction process.

FIG. 18 illustrates the mechanism 90 during a rollover event. In this example, the movement of the cable support block 44 occurs with respect to the third axis 98. Third axis 98 is defined by a main shaft 100 about which there is positioned a torsion spring 101. When the mechanism 90 is set for a rollover event, the latch lock 92 remains locked with respect to the cable support block 44, such that the second axis 108 of rotation is locked and not available. The only available axis for rotation is the third axis 98 (rotation about the main shaft 100). Accordingly, during a rollover event, pressure against the cable support block 44 causes the main shaft 100 to pivot and the support arm 102 to rotate downwardly, as shown by FIG. 18. Because the cable 94 is somewhat flexible, it does not transfer this downward load to the motion actuator 74. This separates the retraction mechanism components from the rollover mechanism components, such that the retraction mechanism components do not experience force or load transmitted during rollover. In short, the retraction motion and the rollover motion are in different, separate paths.

Figure 19A:
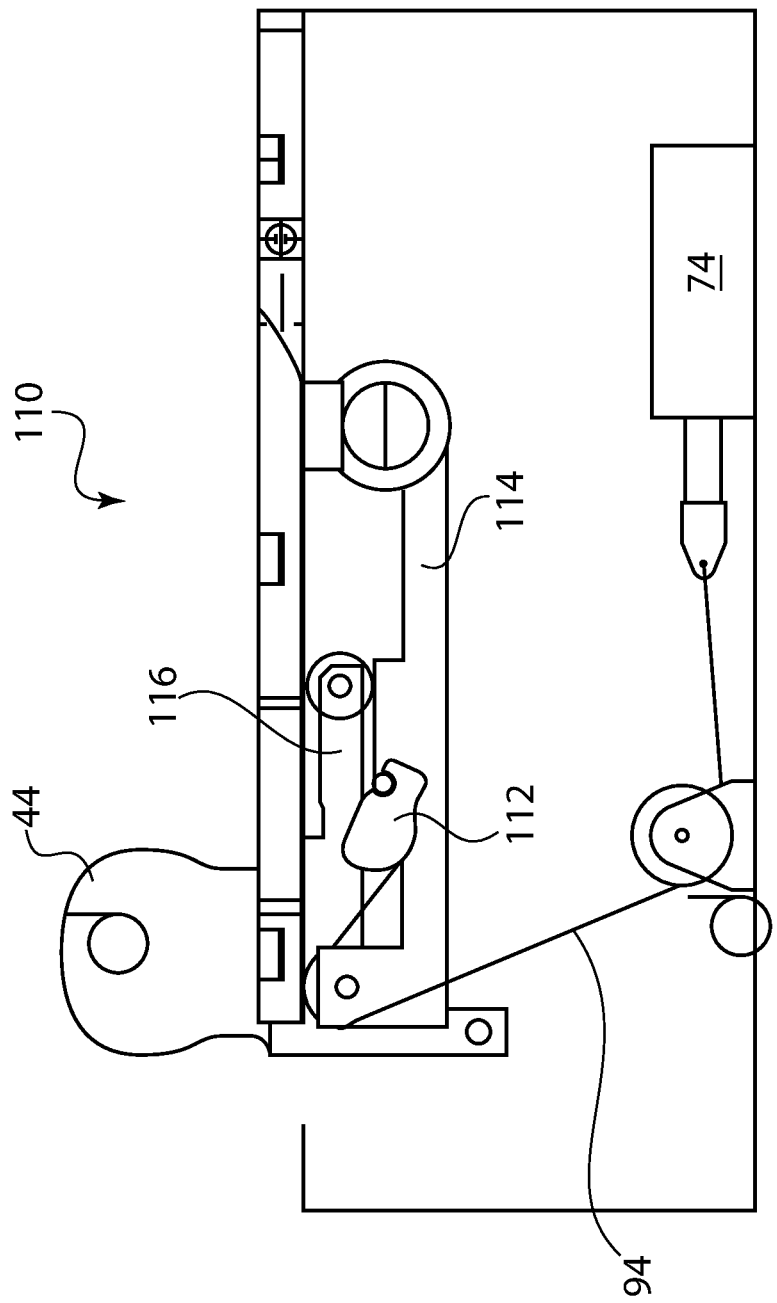
FIGS. 19A-19B show an alternate embodiment of a retraction/roller mechanism.
Figure 19B:
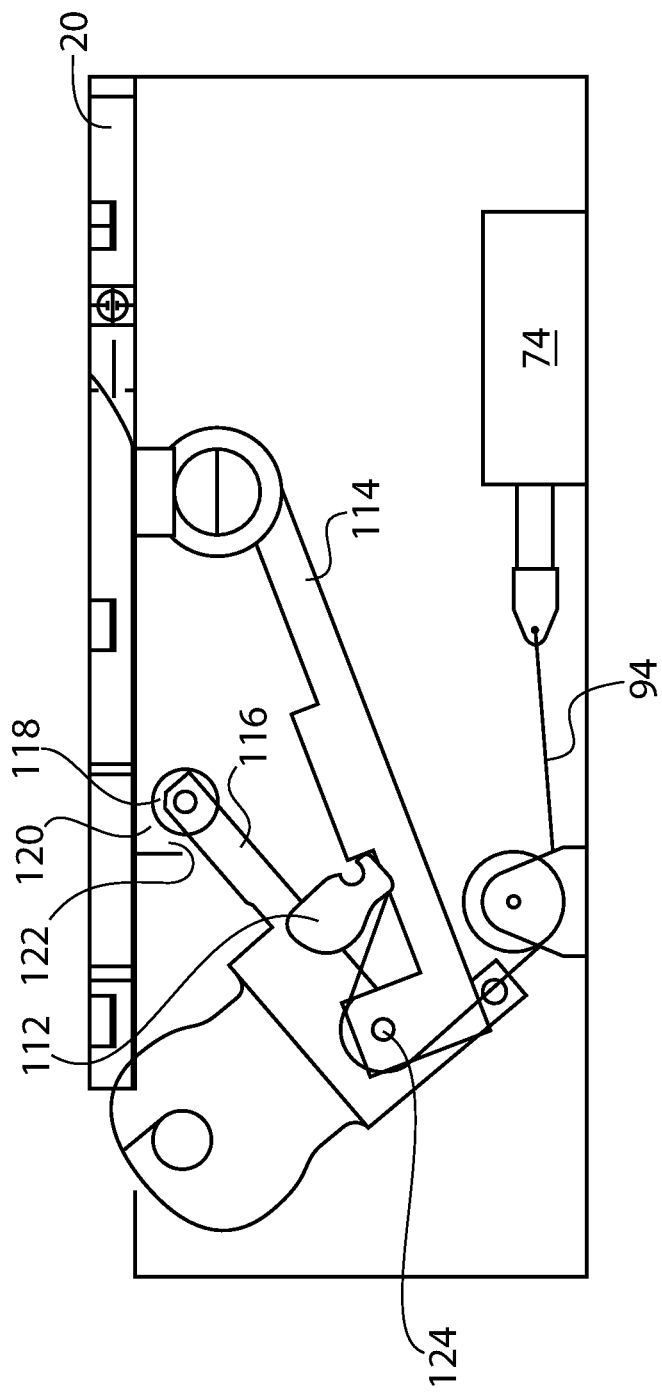
Figure 20:
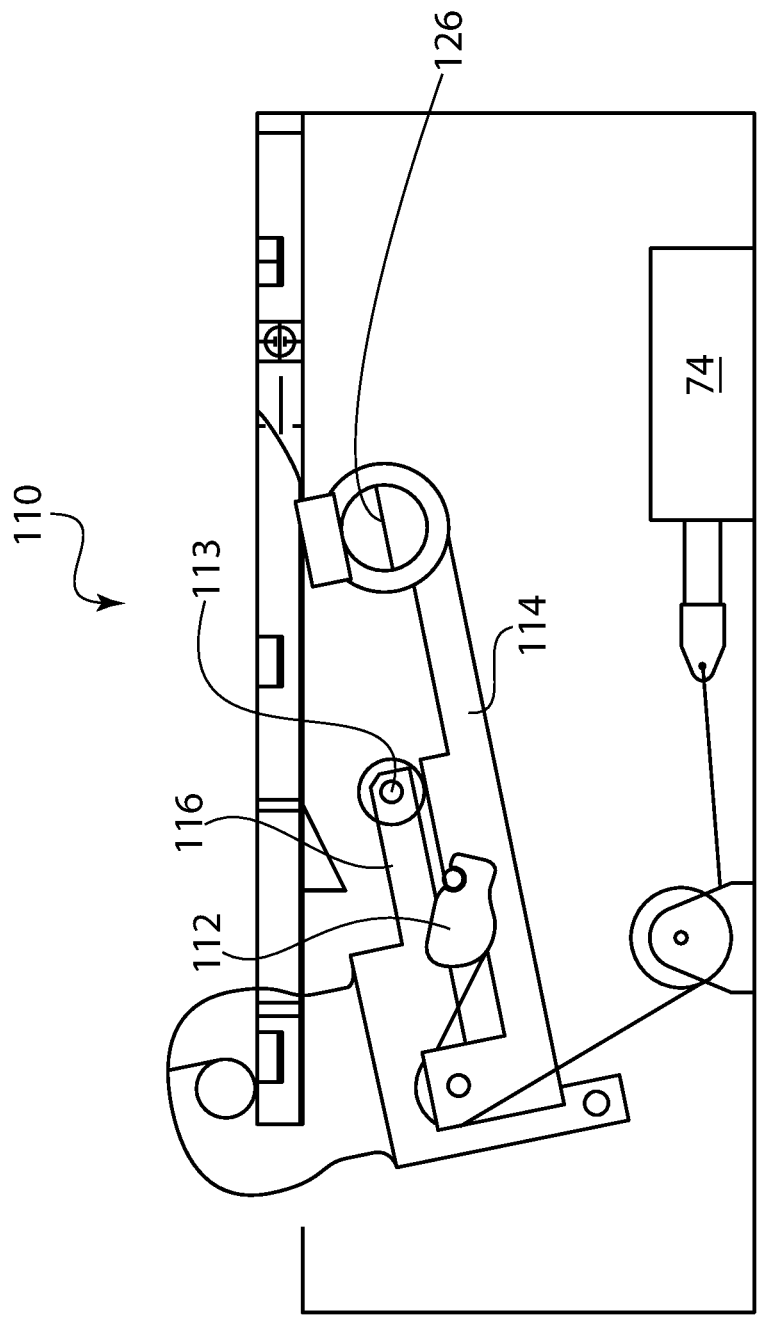
FIG. 20 shows the mechanism of FIGS. 19A-19B in a rollover position.

FIGS. 19A-19B and 20 illustrate an alternate embodiment of a retraction/rollover mechanism 110. This mechanism also uses a motion actuator 74 and a cable 94 for retraction of the cable support block 44. One end of the cable 94 is secured to the motion actuator 74, and one end of the cable is secured to a hook arm of the lock mechanism 112. In this embodiment, activation of the motion actuator 74 causes a pull force applied to the cable 94, which releases a lock mechanism 112 that secures a support arm 114 to a roller arm 116. Release of lock mechanism 112 disengages the roller arm 116 from the support arm, as illustrated by FIG. 19B. Continued retraction of the cable 94 causes a roller 118 of the roller arm to roll against the lower surface of the cover plate 20 until it reaches ramp 120. Ramp 120 is formed as a declined ramp on the lower surface of the cover plate. When the roller 118 reaches the ramp 120 and rolls down the declined ramp face 122, continued retraction motion from the motion actuator 74 pulls the roller arm 116 to cause it to recess or decline into the trough 50. As illustrated, pulley action can help the described movement. The roller arm 116 pivots with respect to the support arm 114 at first axis 124.

FIG. 20 illustrates the mechanism 110 during a rollover event. In this example, the support arm 114 remains locked to the roller arm 116 via the lock mechanism 112. (This is because the cable 94 is not pulled by the motion actuator 74 so it does not cause release of the lock mechanism 112 from pin 113.) During a rollover event, the support arm pivots at the second axis 126. This pivoting does not translate any force to the motion actuator 74. Instead, in this version, only the support arm 114 rotates with respect to the second axis 126. The first axis 124 remains locked and is unavailable for rotation thereabout.

Figure 21:
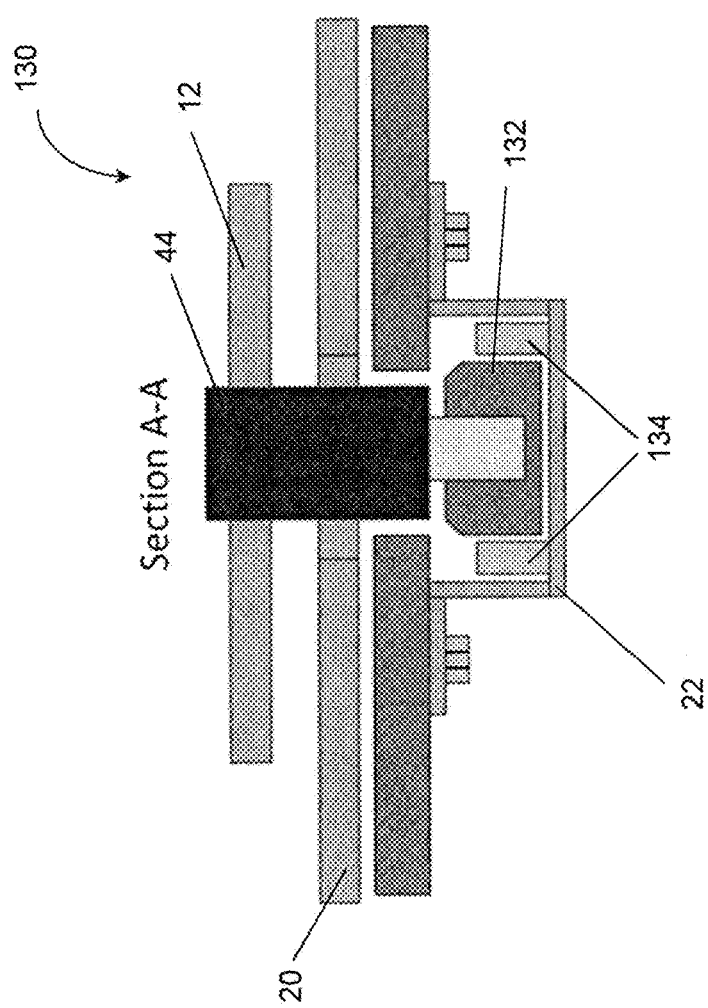
FIG. 21 shows a front plan view of a further embodiment of a retraction/roller mechanism.

A further alternate embodiment is illustrated by FIGS. 21, 22A-22B, and 23. These figures illustrate a retraction/rollover mechanism 130 that uses a rolling or sliding trolley 132. FIGS. 21 and 22A show the mechanism in battery position. The retraction position is shown in FIG. 22B. FIG. 23 is the rollover position. In this embodiment, a trolley 132 may be provided with one or more wheels 134 that allow the trolley 132 to roll with respect to the support frame 22. This embodiment provides a cable 94 with one end that is secured to the cable support block 44 and another end that is secured to the trolley 132. During a retraction event, movement of the trolley 132 is caused by a motion actuator 74. As the trolley 132 is retracted, pressure on the cable 94 rotates/pulls the cable support block 44 around a first axis 138 with respect to a support block engagement roller 136. This moves the cable support block 44 into the retracted position, as illustrated by FIG. 22B.

FIG. 23 illustrates the mechanism 130 during a rollover event. In this example, the trolley 132 is not moved via the motion actuator 74, such that it remain stationary. This allows the trolley 132 to primarily function as a lock, preventing the cable support block from rotating with respect to the first axis 138 support block engagement roller 136. Instead, pressure on the cable support block 44 causes downward deflection movement of an arm 140 that may be pivotally secured to the motion actuator 74 at a second axis 142. The cable support block is not permitted to rotate with respect to the first axis 138 due to the location of the trolley 132. Instead, downward movement of the arm 140 allows downward movement of the cable support block 44.

Although certain embodiments have been shown and described in this disclosure, it should be understood that the concepts disclosed may be implemented using other mechanical systems. The general goal is that the arresting cable retraction mechanism provides one axis of rotation for the rollover event, and a second, separate axis of rotation for the retraction event. This prevents the motion actuator from absorbing the force from the rollover. Instead, the motion actuator and its related components is mechanically isolated from force during a rollover event. The motion actuator is operably coupled to the cable support block during a retraction event only.

The subject matter of certain embodiments of this disclosure is described with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

It should be understood that different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. An arresting cable retraction system for securing a cross-runway cable across an aircraft runway, comprising:
   a cable support block assembly configured to receive a cross-runway cable;

a support arm assembly that supports the cable support block and that comprises a first axis of rotation about which the support arm assembly rotates during an aircraft rollover event, wherein at least a portion of the cable support block and the cable is maintained above the runway;

wherein the support arm comprises a second axis of rotation about which the cable support block assembly rotates during a retraction event, wherein the cable is retracted into a runway trough;

a lock mechanism that secures the support block assembly to the support arm assembly, wherein when the lock mechanism is locked, the support arm assembly rotates about the first axis of rotation upon aircraft wheel pressure to the cable support block assembly;

a retraction arm assembly that releases the lock mechanism to decouple the cable support block assembly from the support arm assembly, wherein when the lock mechanism is unlocked, the support arm and the locking mechanism remain stationary without rotating about any axis and the cable support block assembly rotates about the second axis of rotation to retract the cable into the runway trough.

2. The system of claim 1, wherein the lock mechanism comprises one or more lock blocks configured to receive a lock pin.

3. The system of claim 1, wherein the system is housed within a support box mounted within an aircraft runway and covered by cover plate.

4. The system of claim 1, where in the support block assembly is modular.

5. The system of claim 1, wherein the support block assembly comprises a cable support block and a housing, wherein the cable support block is removably securable with respect to the housing.

6. The system of claim 1, further comprising a support arm assembly and a retraction arm assembly, wherein the support arm assembly comprises a main shaft that functions as the first axis of rotation, and wherein the retraction arm assembly has a support block shaft that functions as the second axis of rotation.

7. The system of claim 1, wherein the support block assembly comprises a housing that supports a lock pin.

8. The system of claim 7, further comprising a support arm that comprises one or more lock blocks that receive the lock pin in order to secure the support block assembly to the support arm assembly.

9. The system of claim 1, further comprising a retraction arm and a motion actuator, wherein the motion actuator is operably coupled to the retraction arm assembly.

10. The system of claim 1, further comprising a motion actuator that is coupled to a latch lock via a cable.

11. An arresting cable retraction system for securing a cross-runway cable across an aircraft runway, comprising:
a cable support block assembly configured to receive a cross-runway cable;
a first axis of rotation about which a support arm assembly rotates during an aircraft rollover event, wherein the cable is maintained above the runway;
a second axis of rotation about which the cable support block assembly rotates during a retraction event, wherein the cable is retracted into a runway trough; and
a movable trolley, wherein when the movable trolley is in a first position, the cable support block is permitted to rotate with respect to the movable trolley, wherein when the movable trolley is in a second position, the cable support block is prevented from rotation with respect to the movable trolley.

12. The system of claim 1, wherein the arresting cable retraction system comprises a top cover with a cable relief indentation.

13. A modular cable support clock for an arresting cable retraction system for securing a cross-runway cable across an aircraft runway, comprising:
a modular support block defining an opening for receiving a cross-runway cable;
a housing configured to receive the modular support block, wherein the modular support block is removably secured with respect to the housing; and
a lock mechanism that secures the modular support block with respect to the housing.

14. The system of claim 13, wherein removable securement is achieved via insert grooves positioned along one of the modular support block or the housing that cooperate with tracks positioned on the other of the modular support block or the housing.

* * * * *